(12) United States Patent
Kimura et al.

(10) Patent No.: US 9,001,757 B2
(45) Date of Patent: Apr. 7, 2015

(54) COMMUNICATION APPARATUS, COMMUNICATION METHOD, COMPUTER PROGRAM AND COMMUNICATION SYSTEM

(75) Inventors: Ryota Kimura, Tokyo (JP); Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 124 days.

(21) Appl. No.: 13/508,056

(22) PCT Filed: Nov. 1, 2010

(86) PCT No.: PCT/JP2010/006438
§ 371 (c)(1),
(2), (4) Date: May 4, 2012

(87) PCT Pub. No.: WO2011/058716
PCT Pub. Date: May 19, 2011

(65) Prior Publication Data
US 2012/0224534 A1 Sep. 6, 2012

(30) Foreign Application Priority Data
Nov. 13, 2009 (JP) .................................. 2009-259536

(51) Int. Cl.
*H04W 4/00* (2009.01)
*H04W 28/06* (2009.01)

(52) U.S. Cl.
CPC ...................................... *H04W 28/06* (2013.01)

(58) Field of Classification Search
CPC .................................................. H04W 28/06
See application file for complete search history.

(56) References Cited

U.S. PATENT DOCUMENTS

| 7,688,847 | B2 * | 3/2010 | Kim et al. ...................... 370/448 |
| 2004/0218695 | A1 | 11/2004 | Koga et al. |
| 2007/0223608 | A1 | 9/2007 | Nakayama et al. |
| 2009/0196364 | A1 | 8/2009 | Nakajima et al. |
| 2009/0232124 | A1 * | 9/2009 | Cordeiro et al. .............. 370/349 |
| 2009/0323594 | A1 * | 12/2009 | Mishra et al. ................. 370/328 |
| 2010/0226315 | A1 * | 9/2010 | Das et al. ...................... 370/328 |

(Continued)

FOREIGN PATENT DOCUMENTS

| CN | 1739274 A | 2/2006 |
| CN | 102656816 A | 9/2012 |
| JP | 2855172 | 2/1999 |

(Continued)

OTHER PUBLICATIONS

International Search Report Issued Dec. 14, 2010 in PCT/JP10/06438 Filed Nov. 1, 2010.

(Continued)

*Primary Examiner* — Robert Wilson
(74) *Attorney, Agent, or Firm* — Oblon, McClelland, Maier & Neustadt, L.L.P.

(57) ABSTRACT

A communication apparatus to transmit a plurality of frames in a network, where each frame includes one or more symbols having a symbol length, includes a data processing unit. The data processing unit acquires an inter-frame space between two consecutive frames from the plurality of frames. The data processing unit further adjusts the inter-frame space between the two consecutive frames upon determination that the inter-frame space is not an integral multiple of the symbol length. The communication apparatus also includes a transmitter unit to transmit the adjusted consecutive frames.

14 Claims, 15 Drawing Sheets

(56) References Cited

U.S. PATENT DOCUMENTS

| | | | |
|---|---|---|---|
| 2012/0170565 A1* | 7/2012 | Seok | 370/338 |
| 2012/0224534 A1* | 9/2012 | Kimura et al. | 370/328 |

FOREIGN PATENT DOCUMENTS

| | | |
|---|---|---|
| JP | 2001 148646 | 5/2001 |
| JP | 2006 518571 | 8/2006 |
| JP | 2007 89113 | 4/2007 |
| JP | 2007 166120 | 6/2007 |
| JP | 2007 258904 | 10/2007 |
| JP | 2008 236065 | 10/2008 |
| JP | 2009 506679 | 2/2009 |
| JP | 2009 164751 | 7/2009 |

OTHER PUBLICATIONS

Combined Chinese Office Action and Search Report issued May 4, 2014 in Patent Application No. 201080049942.9 (with English language translation).

* cited by examiner

COMMUNICATION APPARATUS, COMMUNICATION METHOD, COMPUTER PROGRAM AND COMMUNICATION SYSTEM

TECHNICAL FIELD

The present invention relates to a communication apparatus and a communication method to which space division multiple access (SDMA) in which wireless resources on spatial axes are shared by a plurality of users is applied, a computer program, and a communication system, and in particular, relates to a communication apparatus and a communication method that transmit frames in a variable length frame format addressed to a plurality of users by multiplexing the frames at the same time, a computer program, and a communication system.

BACKGROUND ART

Nowadays, the wireless local area network (WLAN) is rapidly coming into widespread use, making the network environment in offices and homes wireless. For example, IEEE802.11a/g, which is a standard by Institute of Electrical and Electronics Engineers (IEEE), realizes a physical layer data rate of max 54 Mbps by using orthogonal frequency division multiplexing (OFDM) on frequencies in a 2.4 GHz band or 5 GHz band. In IEEE802.11n currently under development, high throughput (HT) exceeding 100 Mbps is about to be realized by further using space division multiplexing (SDM) through a multiple input multiple output (MIMO) channel.

MIMO is a communication method to realize a space multiplexed stream by providing a plurality of antenna elements on each of the transmitter and receiver sides (known). On a transmitting side, a plurality of pieces of transmission data is space/time-encoded and multiplexed and then distributed over a plurality of transmitting antennas before being transmitted to a channel. On a receiving side, by contrast, reception signals received by a plurality of receiving antennas via the channel are space/time-decoded and demultiplexed into the plurality of pieces of transmission data so that the original data can be obtained without crosstalk between streams. According to MIMO technology, for example, with an increasing number of streams to be spatially multiplexed by increasing the number of antennas of communication equipment, throughput per user can be improved while maintaining downward compatibility. However, further improvement of throughput for the whole of a plurality of users will be demanded in the future.

The IEEE802.11ac working group aims to develop a wireless LAN standard whose data transmission speed exceeds 1 Gbps by using a frequency band of 6 GHz or below and for realization thereof, a communication method like multi-user MIMO (MU-MIMO) and SDMA that shares wireless resources on the spatial axes among a plurality of users, that is, multiplexes frames addressed to a plurality of users at the same time in the directions of spatial axes is considered to be promising.

Currently, SDMA is under study as a basic technology of a next-generation mobile phone system based on time division multiple access (TDMA) such as PHS (Personal Handyphone System) and LTE (Long Term Evolution). While attention is being given, as described above, to one-to-many communication in the field of wireless LAN, there is almost no example of application thereof. This can be considered to be also based on the fact that it is difficult to efficiently multiplex a plurality of users in packet communication.

When SDMA is applied to the wireless LAN, a case in which variable length frames are multiplexed on the same time axis can be considered. This causes no problem when the transmission data length for each of the plurality of users has the same size for all, but if the frame length to be multiplexed varies due to differences of the transmission data length, the total transmission power abruptly changes accompanying an increase/decrease in the multiplexing number of frames in a period of transmission. If frames having different lengths are multiplexed and transmitted unchanged, problems may arise from various points of view, for example, reception power abruptly changes on the receiving side accompanying an increase/decrease in the multiplexing number of frames, inducing an unstable operation in terms of auto gain control (AGC), and power distribution within a frame regarding RCPI (Received Channel Power Indicator) standardized by IEEE802.11 becomes non-fixed. Thus, even if the original transmission data length for each user varies, frames multiplexed at the same time need to be transmitted in the end with the same frame length.

For example, in a system of the fixed frame format like a conventional cellular system, frames can be padded by insertion of data for diversity (see, for example, Patent Literature 1), scheduling of assigned time (see, for example, Patent Literature 2), variable data rate (see, for example, Patent Literatures 3 and 4), or variable channel configuration (see, for example, Patent Literature 5). On the contrary, since a system of the variable length frame format such as the wireless LAN has a basically different structure, it is difficult to apply these conventional technologies to such a system of the variable length frame format.

In a WLAN system, "burst" technology that continuously transmits a plurality of frames in the time direction is adopted for the purpose of improving frame efficiency. To implement the bursting, a space (Inter-Frame Space: IFS) is provided between consecutive frames. While a zero IFS (ZIFS) is used between consecutive frames using the same transmission power for immediate transmission, a reduced IFS (RIFS) is used when transmission power changes between frames. The RIFS is short when compared with other inter-frame spaces such as the short IFS (SIFS) and thus, a communicating station can continue to control channels. In IEEE802.11n, for example, the inter-frame space of 2 ms called RIFS is defined. In consideration of frame efficiency, the inter-frame space is preferably shorter.

CITATION LIST

Patent Literature

PTL 1: Japanese Patent Application Laid-Open No. 2001-148646
PTL 2: Japanese Patent Application National Publication No. 2009-506679
PTL 3: Japanese Patent Application Laid-Open No. 2008-236065
PTL 4: Japanese Patent No. 2855172
PTL 5: Japanese Patent Application Laid-Open No. 2007-89113

SUMMARY OF INVENTION

According to some embodiments, a communication apparatus to transmit a plurality of frames in a network, where each frame includes one or more symbols having a symbol length, includes a data processing unit and a transmitter. The data processing unit acquires an inter-frame space between two consecutive frames from the plurality of frames. The data processing unit adjusts the inter-frame space between the two consecutive frames upon determination that the inter-frame space is not an integral multiple of the symbol length. The transmitter unit transmits the adjusted consecutive frames.

According to some embodiments, a communication system includes a transmitter and a receiver. The transmitter acquires an inter-frame space between two consecutive frames from a plurality of frames, where each frame include one or more symbols having a symbol length. The transmitter further adjusts the inter-frame space between the two consecutive frames upon determination that the inter-frame space is not an integral multiple of the symbol length. The transmitter also transmits the adjusted consecutive frames. The receiver receives the adjusted consecutive frames.

According to some embodiments, a method for transmitting a plurality of frames, where each frame includes one or more symbols having a symbol length, includes acquiring an inter-frame space between two consecutive frames from the plurality of frames. The method further includes adjusting the inter-frame space between the two consecutive frames upon determination that the inter-frame space is not an integral multiple of the symbol length. The method also includes transmitting the adjusted consecutive frames.

According to some embodiments, a non-transitory computer readable medium having instructions stored thereon, which when executed by a processor in a communication apparatus causes the processor to acquire an inter-frame space between two consecutive frames, where each frame include one or more symbols having a symbol length. The instructions further cause the processor to adjust the inter-frame space between the two consecutive frames upon determination that the inter-frame space is not an integral multiple of the symbol length. The instructions also cause the processor to transmit the adjusted consecutive frames.

Technical Problem

If, like SDMA, a plurality of frames is multiplexed at the same time, in view of demodulation of a plurality of reception signals on the receiving side, the symbol timing is preferably mutually aligned among spatially multiplexed frames. In IEEE802.11n described above, however, while the symbol length is 4 ms, the RIFS is 2 ms. That is, if bursting is simply implemented using the RIFS when the inter-frame space and the symbol length are different, the symbol timing among multiplexed frames is not aligned, causing inconvenience for the receiver side.

Taking the OFDM modulation method as an example, a reception signal of each antenna is cut out by an FFT window opened in the same symbol timing synchronization and OFDM-demodulated, and then, space/time-decoded and demultiplexed into a plurality of pieces of transmission data. Since interference occurs between symbols in reception frames whose symbol timing does not match, it is difficult to correctly demultiplex reception signals even though the reception signals are space/time-decoded.

To sum up, when any frame to be multiplexed at the same time is continuously transmitted in the time direction in multiple access communication, the mutual symbol timing among a plurality of frames to be multiplexed needs to be sufficiently considered to ensure decoding performance on the receiver side.

The present invention aims to provide a superior communication apparatus and communication method capable of performing a suitable communication operation by applying space division multiplexing in which wireless resources on the spatial axes are shared by a plurality of users, a computer program, and a communication system.

The present invention further aims to provide a superior communication apparatus and communication method capable of multiplexing frames in a variable length frame format addressed to a plurality of users at the same time and suitably transmitting the frames, a computer program, and a communication system.

The present invention further aims to provide a superior communication apparatus and communication method capable of multiplexing a plurality of variable length frames at the same time and suitably transmitting the frames while applying "bursting" that continuously transmits a plurality of frames in the time direction, a computer program, and a communication system.

The present invention further aims to provide a superior communication apparatus and communication method capable of improving frame efficiency by applying bursting while considering the symbol timing among frames to be multiplexing at the same time, a computer program, and a communication system.

Advantageous Effects of Invention

As described above, a superior communication apparatus and communication method capable of multiplexing a plurality of variable length frames at the same time and suitably transmitting the frames while applying "bursting" that continuously transmits a plurality of frames in the time direction, a computer program, and a communication system can be provided.

Also according to the present invention, a superior communication apparatus and communication method capable of improving frame efficiency by applying bursting while considering matching of the symbol timing among frames to be multiplexing at the same time, a computer program, and a communication system can be provided.

According to another aspect of the present invention, on the transmitter side, the symbol timing of frames to be continuously transmitted in the time direction by applying bursting can be aligned with that of other frames to be multiplexed at the same time. Accordingly, on the receiver side, multiplexed frames can suitably be demultiplexed while avoiding interference between symbols so that signal decoding processing can be simplified.

According to still another aspect of the present invention, the frame length of frames to be multiplexed at the same time is made uniform in the stage of final output on the transmitter side and thus, instability of operation of AGC on the receiver side can be eliminated. Moreover, the symbol timing of frames to be continuously transmitted in the time direction by applying bursting can be aligned with that of other frames to be multiplexed at the same time. Accordingly, on the receiver side, multiplexed frames can suitably be demultiplexed while avoiding interference between symbols so that signal decoding processing can be simplified.

According to still another aspect of the present invention, instability of operation of AGC on the receiver side can be relieved by using the same average power for an interval to be padded and a whole frame to be padded. Moreover, power distribution within a frame can be made constant so that when the receiver side measures reception power of a signal in the whole frame, precision of measurement is improved.

According to still another aspect of the present invention, in accordance with claims 12 and 32 of the present invention, instability of operation of AGC on the receiver side can be relieved by using the same average power for an inter-frame space composed of a pattern other than null and at least one frame of frames prior to and subsequent to the inter-frame space as a whole. Moreover, power distribution within a frame can be made constant so that when the receiver side measures reception power of a signal in the whole frame, precision of measurement is improved.

Still other purposes, features, and advantages of the present invention will be clear from embodiments of the present invention described below and a more detailed description based on appended drawings.

DESCRIPTION OF EMBODIMENTS

Figure 1:
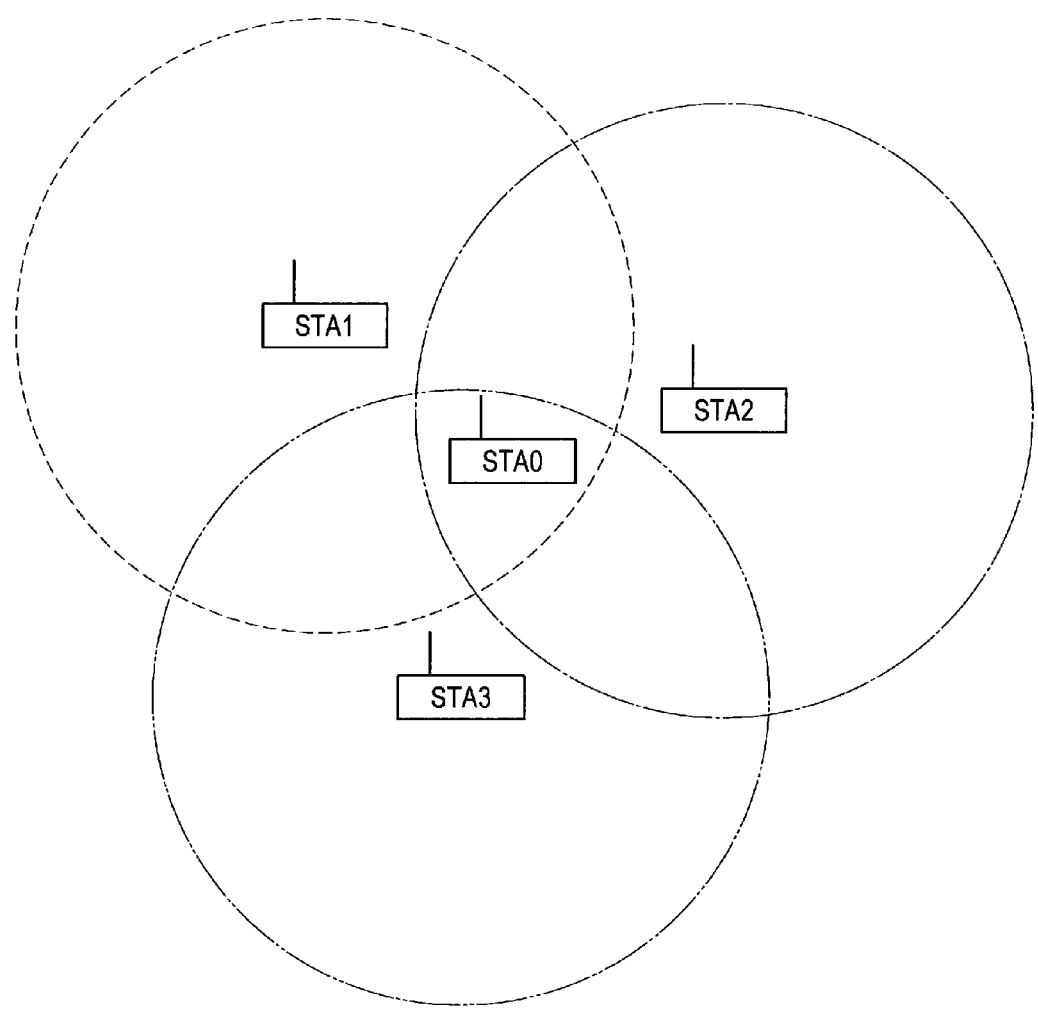
FIG. 1 is a diagram schematically showing the configuration of a communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 schematically shows the configuration of a communication system according to an embodiment of the present invention. The illustrated communication system is constituted of a communicating station STA0 operating as an access point (AP) and a plurality of communicating stations STA1, STA2, and STA3 operating as terminal stations (client device) (MT).

Each of the communicating stations STA1, STA2, and STA3 accommodates the communicating station STA0 in a respective communication range and each communicating station can directly communicate with STA0 (in other words, each of the communicating stations STA1, STA2, and STA3 is placed under the command of STA0 as an access point to constitute BSS (Basic Service Set)). However, each of the communicating stations STA1, STA2, and STA3 as a terminal station does not have to be present in each other's communication range and direct communication between terminal stations will not be mentioned below.

STA0 as an access point can perform not only one-to-one frame communication with each of the communicating stations STA1, STA2, and STA3 individually, but also one-to-many frame communication with each of the communicating stations STA1, STA2, and STA3 by applying multiple access. In the latter case, wireless resources will be shared among a plurality of users by multiplexing frames addressed to the plurality of users in the spatial axes direction, time axis direction, frequency axis direction, or code axis direction.

STA0 as an access point is a communication apparatus that performs one-to-many frame communication conforming to a communication standard such as IEEE802.11ac. That is, the communication apparatus includes a plurality of antennas, applies space division multiplexing with an adaptive array antenna, and performs one-to-many frame communication by multiplexing two or more frames addressed to different communicating stations at the same time and demultiplexing frames transmitted after being multiplexed at the same time and addressed to the local station into frames by each source by two or more communicating stations. In this case, STA0 can increase the number of multiple access enabled terminal stations by providing more antennas.

On the other hand, the communicating stations STA1, STA2, and STA3 as terminal stations include a plurality of antennas and are composed of communication apparatuses that performs space division multiplexing with an adaptive array antenna. The communicating stations STA1, STA2, and STA3 perform user demultiplexing only for reception and do not perform user demultiplexing for transmission, that is, multiplexing of transmission frames and thus do not have to include as many antennas as the access point.

Communication from the access point STA0 to each of the communicating stations STA1, STA2, and STA3 will be called a "downlink" and communication from each of the communicating stations STA1, STA2, and STA3 to the access point STA0 will be called an "uplink".

Figure 2:
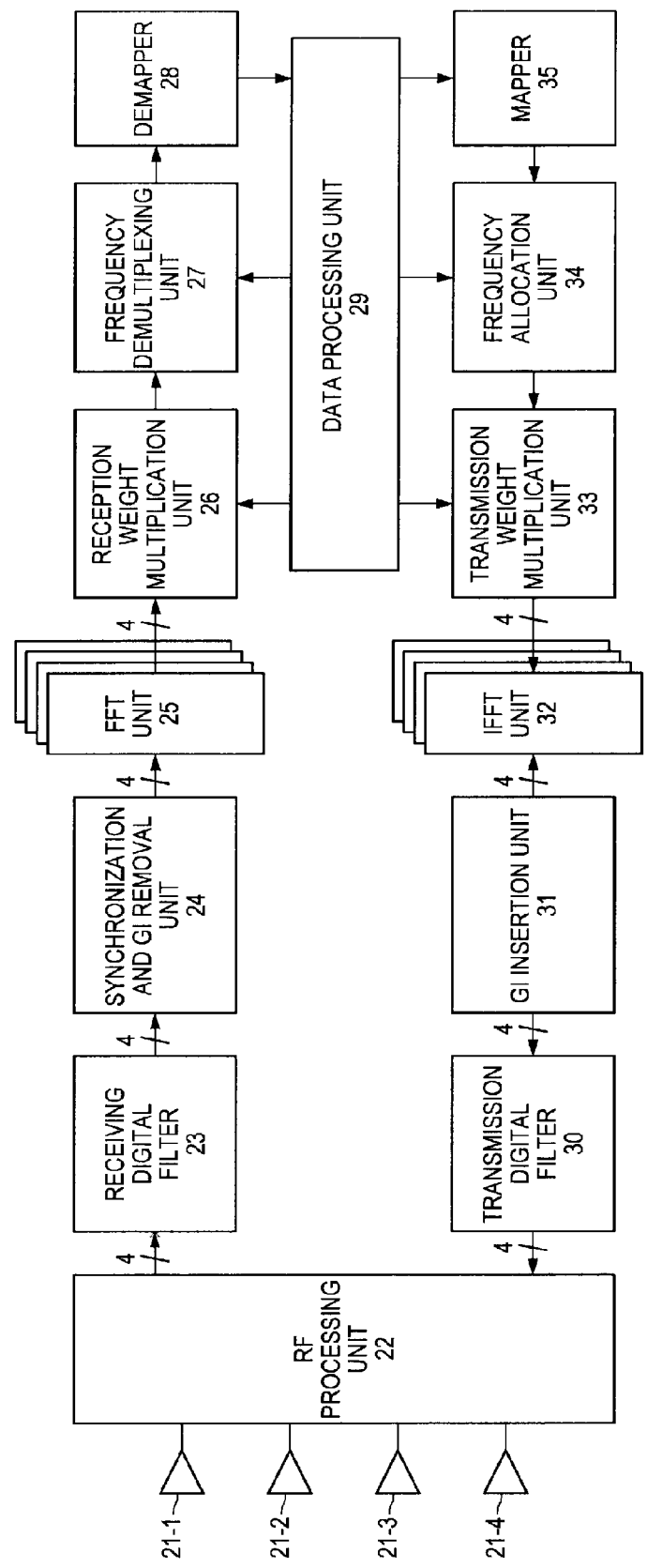
FIG. 2 is a diagram showing a configuration example of a communication apparatus to which space division multiplexing is applied.

FIG. 2 shows a configuration example of a communication apparatus to which space division multiplexing is applied. It is assumed that the communicating station STA0 operating as an access point in the communication system shown in FIG. 1 has the configuration shown in FIG. 2.

The illustrated communication apparatus includes a plurality (four in the illustrated example) of antenna elements 21-1, 21-2, . . . , an RF processing unit 22, a reception processing unit composed of function blocks 23 to 28, a data processing unit 29, and transmission branches composed of function blocks 30 to 35. The communicating station STA0 as an access point performs space division multiplexing with an adaptive array antenna and the number of communicating stations that can be accommodated through multiple access can be enhanced by including more antenna elements.

The data processing unit 29 generates transmission frames in response to a transmission request from an upper layer application (not shown). In the present embodiment, a transmission request of multiple access (that is, multiplexed at the same time) frames by space division or the like or frames to be burst (that is, to be continuously transmitted in the time direction) may be delivered to the data processing unit 29. The data processing unit 29 performs processing to adjust the length among consecutive frames before frames being burst and details thereof will be described later.

A mapper 35 sequentially maps a transmission data series to the signal space instructed by the data processing unit 29. Mapping here corresponds to primary modulation that maps a 2n-bit symbol (n is an integer 0 or greater) to a signal point in a signal space such as PSK (Phase Shift Keying) and QAM (Quadrature Amplitude Modulation). The data processing unit 29 decides the modulation method by adapting to communication quality of the channel for each user and the mapper 35 switches the modulation method for frames addressed to each user and to be multiplexed in accordance with instructions from the data processing unit 29.

A frequency allocation unit 34 sequentially allocates the mapped transmission data series to each subcarrier on the frequency axis in accordance with instructions from the data processing unit 29. Then, a transmission weight multiplication unit 33 performs user demultiplexing by multiplying the transmission data series by a transmission weight in accordance with instructions from the data processing unit 29 to distribute the transmission data series over the transmission branches for each of the antenna elements 21-1, 21-2, . . . .

An IFFT (Inverse Fast Fourier Transform) unit 32 converts the subcarrier for each transmission branch arranged in the frequency region into a time axis signal and further attaches a guard interval thereto through a GI (guard interval) insertion unit 31. Then, after the band thereof being limited by a transmission digital filter 30 composed of an FIR (finite impulse response) filter or the like, the IFFT unit 32 converts the time axis signal into an analog transmission baseband signal.

The RF processing unit 22 removes signal components other than those of a desired band by an analog LPF, up-converts the center frequency to a desired RF (Radio Frequency) frequency band, and further amplifies the signal amplitude by power amplification. Then, an RF transmission signal for each transmission branch is discharged into space from each of the antenna elements 21-1, 21-2, . . . .

The RF processing unit 22 also down-converts a reception signal from each of the antenna elements 21-1, 21-2, . . . into an analog baseband signal after low noise amplification and further converts into a digital reception baseband signal.

A receiving digital filter 23 is composed of an FIR filter or the like and imposes band limitations on the digital reception signal. A synchronization and GI removal unit 24 acquires synchronization timing from the digital reception signal on which band limitations are imposed, further makes a frequency offset correction, estimates noise, and also removes the guard interval attached to the head of a data transmission interval. Then, each FFT (Fast Fourier Transform) unit 25 cuts out a time axis signal for each reception branch in an FFT window opened in the same symbol timing as that acquired by the synchronization and GI removal unit 24 and converts the time axis signal into a frequency axis signal by OFDM demodulation through the Fourier transform.

A reception weight multiplication unit 26 multiplies a reception signal after OFDM demodulation for each reception branch by a reception weight in accordance with instructions from the data processing unit 29 to perform space demultiplexing. "Space demultiplexing" for reception here is assumed to have both meanings of user demultiplexing that demultiplexes frames multiplexed at the same time for each user and channel demultiplexing that demultiplexes a spatially multiplexed MIMO channel into a plurality of original streams.

A frequency demultiplexing unit 27 demultiplexes a reception data series from each subcarrier on the frequency axis in accordance with instructions from the data processing unit 29. A demapper 28 demaps signal points in the signal space from the demultiplexed reception data series in accordance with instructions from the data processing unit 29 to reproduce the original transmission data series. The data processing unit 29 delivers the reproduced transmission data to the upper layer application (not shown).

Figure 3:
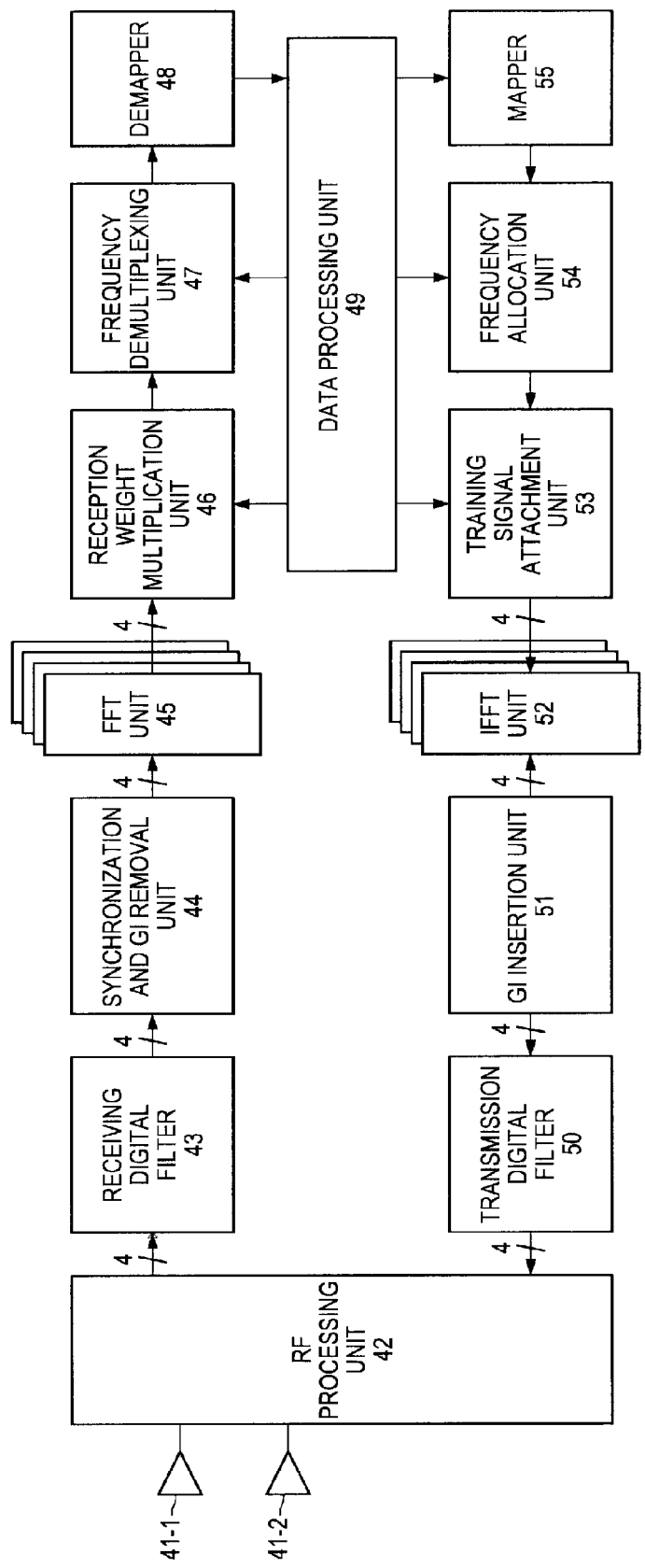
FIG. 3 is a diagram showing another configuration example of the communication apparatus to which space division multiplexing is applied.

FIG. 3 shows another configuration example of the communication apparatus to which space division multiplexing is applied. It is assumed that the communicating stations STA1, STA2, and STA3 operating as terminal stations in the communication system shown in FIG. 1 have the configuration shown in FIG. 3.

The illustrated communication apparatus includes a plurality (two in the illustrated example) of antenna elements 41-1 and 41-2 to realize an adaptive array antenna function, an RF processing unit 42, a reception processing unit composed of function blocks 43 to 48, a data processing unit 49, and transmission branches composed of function blocks 50 to 55.

The data processing unit 49 generates transmission data in response to a transmission request from the upper layer application (not shown). In the present embodiment, a transmission request of frames to be burst, that is, to be continuously transmitted in the time direction may be delivered to the data processing unit 49. The data processing unit 49 performs processing to adjust the length among consecutive frames before frames being burst and details thereof will be described later.

A mapper 55 performs primary modulation of a transmission data series, that is, maps a transmission data series to the signal space in accordance with instructions from the data processing unit 49. A frequency allocation unit 54 sequentially allocates the mapped transmission data series to each subcarrier on the frequency axis in accordance with instructions from the data processing unit 49. A training signal attachment unit 53 not only allocates the transmission data series to the transmission branch for each of the antenna elements 41-1 and 41-2, but also attaches a training signal used to learn the weight of an adaptive array antenna at the transmission destination in accordance with instructions from the data processing unit 49. The training signal is composed of, for example, a known sequence specific to each of the terminal stations STA1 to STA3.

An IFFT unit 52 converts the subcarrier for each transmission branch arranged in the frequency region into a time axis signal and further attaches a guard interval thereto through a guard insertion unit 51. Then, after the band thereof being limited by a transmission digital filter 50, the IFFT unit 52 converts the time axis signal into an analog transmission baseband signal.

The RF processing unit 42 removes signal components other than those of a desired band by the analog LPF, up-converts the center frequency to a desired RF frequency band, and further amplifies the signal amplitude by power amplification. Then, an RF transmission signal for each transmission branch is discharged into space from each of the antenna elements 41-1 and 41-2.

The RF processing unit 42 also down-converts a reception signal from each of the antenna elements 41-1 and 41-2 into an analog baseband signal after low noise amplification and further converts into a digital reception baseband signal.

A receiving digital filter 43 imposes band limitations on the digital reception signal. A synchronization and GI removal unit 44 acquires synchronization timing from the digital reception signal on which band limitations are imposed, further makes a frequency offset correction, estimates noise, and also removes the guard interval attached to the head of the data transmission interval. Then, each FFT unit 45 cuts out a time axis signal for each reception branch in the FFT window opened in the same symbol timing as that acquired by the synchronization and GI removal unit 44 and converts the time axis signal into a frequency axis signal by OFDM demodulation through the Fourier transform.

A reception weight multiplication unit 46 multiplies a reception signal after OFDM demodulation for each reception branch by a reception weight in accordance with instructions from the data processing unit 49 to perform space demultiplexing. "Space demultiplexing" for reception here is assumed to have both meanings of user demultiplexing that demultiplexes frames multiplexed at the same time for each user and channel demultiplexing that demultiplexes a spatially multiplexed MIMO channel into a plurality of original streams.

A frequency demultiplexing unit 47 demultiplexes a reception data series from each subcarrier on the frequency axis in accordance with instructions from the data processing unit 49. A demapper 48 demaps signal points in the signal space from the demultiplexed reception data series in accordance with instructions from the data processing unit 49 to reproduce the original transmission data series. The data processing unit 49 delivers the reproduced transmission data to the upper layer application (not shown).

According to some embodiments, the data processing units 29 or 49 adjusts an inter-frame space between two consecutive frames to an integral multiple of the symbol length. In further embodiments, the data processing units 29 or 49 adjusts the inter-frame space between two consecutive frames by inserting padding information between the two consecutive frames to form a reduced inter-frame space between the padding information, where a frame of the two consecutive frames not including the padding information, a length of the padding information and reduced inter-frame space are equal to an integral multiple of the symbol length. According to further embodiments, the data processing units 29 or 49 adjusts the inter-frame space by inserting padding information between the two consecutive frames, the padding information having a length equal to an integral multiple of the symbol length.

According to embodiments, the data processing unit 29 operates as a transmitter, and the data processing unit 49 operates as a receiver. In further embodiments, the data processing unit 29 operates as a receiver, and the data processing unit 49 operates as a transmitter.

In the communication system shown in FIG. 1, STA0 as an access point learns the weight of an adaptive array antenna by acquiring a transfer function between each antenna element contained in the adaptive array antenna provided with the local station and an antenna element provided with the communicating stations STA1, STA2, and STA3. Alternatively, STA0 can learn the weight of the adaptive array antenna by applying a predetermined adaptive algorithm such as RLS (Recursive Least Square) to a training signal composed of a known sequence received from each of the communicating stations STA1, STA2, and STA3. Then, STA0 forms directivity with respect to each of the communicating stations STA1, STA2, and STA3 based on the weight of the adaptive array antenna learned by one of the above methods. Accordingly, STA0 can spatially demultiplex transmission frames to be multiplexed at the same time and addressed to each of the communicating stations STA1, STA2, and STA3 or reception frames multiplexed at the same time and addressed from each of the communicating stations STA1, STA2, and STA3 so that space division multiplexing in which wireless resources on the spatial axes are shared among a plurality of users can be realized.

STA0 as an access point can learn the weight the adaptive array antenna by using, for example, an RTS/CTS handshake carried out in parallel with the communicating stations STA1, STA2, and STA3. Format examples of each frame RTS (transmission request), CTS (reception preparations), and ACK (response) are described, for example, in the specifications (FIGS. 4 to 6) of Japanese Patent Application No. 2009-113866 transferred to the present applicant.

The amount of traffic each user wants to communicate may not always be uniform. Thus, when the variable length frame format is adopted, the length of frame will differ from user to user. When frames addressed to a plurality of users are transmitted simultaneously after being multiplexed at the same time, total transmission power abruptly changes if frame lengths are different, causing problems such as inducing an unstable operation of AGC accompanying an abrupt change of reception power on the receiver side (described above). Thus, frames multiplexed at the same time need to be transmitted in the end as frames having the same frame length even if the original transmission data length addressed to each user varies.

In a WLAN system, bursting technology to continuously transmit a plurality of frames in the time direction for the purpose of improving frame efficiency is known. When any frame to be multiplexed at the same time is continuously transmitted in the time direction, the mutual symbol timing among a plurality of frames to be multiplexed needs to be sufficiently considered to ensure decoding performance on the receiver side (described above).

Figure 4:
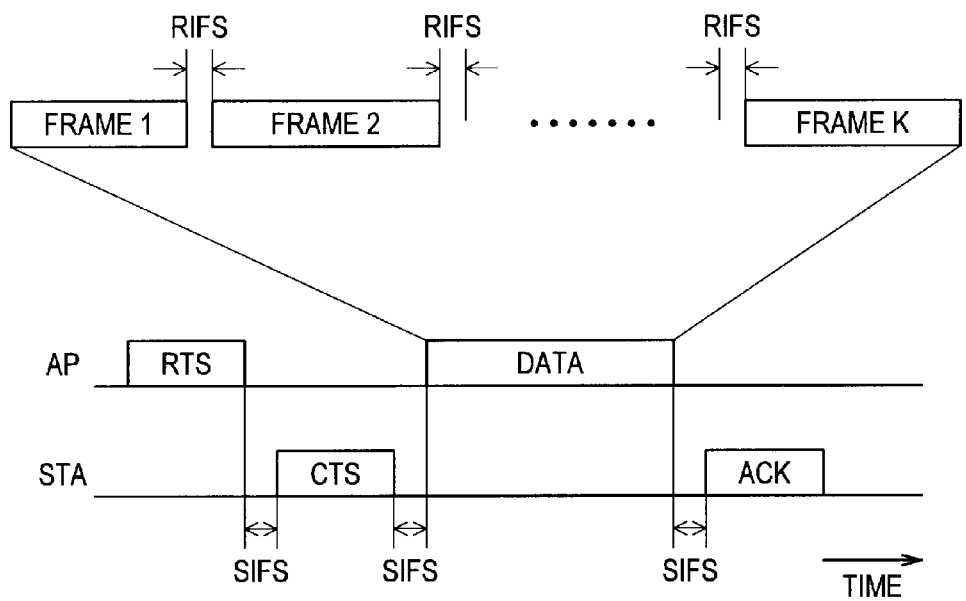
FIG. 4 is a diagram exemplifying a frame sequence when data frames are transmitted by using bursting.

First, a case when a plurality of data frame is not multiplexed at the same time will be described. FIG. 4 exemplifies a frame sequence when data frames are transmitted by using bursting. However, in the illustrated example, it is assumed that data frames are transmitted through a downlink from an access point (AP) to one terminal station (STA).

The AP makes sure that a medium is clear by performing a physical carrier sense in advance and, after further backing off, transmits a transmission request frame (Request to Send: RTS) addressed to the terminal station STA. If any terminal (not shown) hidden to the STA receives an RTS frame whose address does not include the local station, the terminal sets the counter value of NAV based on information described in the duration inside the frame (known) and holds back a transmission operation.

If the terminal station STA recognizes that the received RTS frame is addressed to the local station, after a predetermined inter-frame space (SIFS) after the completion of reception of the frame passes, the terminal station STA returns a reception preparation frame (Clear to Send: CTS) addressed to the AP that is the sender of the RTS frame. If any terminal (not shown) hidden to the STA receives a CTS frame whose address does not include the local station, the terminal sets the counter value of NAV based on information described in the duration inside the frame (known) and holds back a transmission operation.

After completing transmission of the RTS frame, the AP waits to receive the CTS frame. Then, after the predetermined inter-frame space (SIFS) after the completion of reception of the CTS frame from the terminal station STA passes, the AP transmits DATA frames addressed to the terminal station STA. In the illustrated example, the DATA frames are frames to which bursting technology is applied and a plurality of frames 1 to K is continuously transmitted in the time direction with an inter-frame space of a predetermined length sandwiched between frames. Each of the frames 1 to K is assumed to have a variable length frame format. In response thereto, when reception of the DATA frames is completed, the terminal station STA transmits a reception confirmation frame (ACK) after the passage of the predetermined inter-frame space (SIFS).

Incidentally, the frame sequence example shown in FIG. 4 does not limit methods of transmitting/receiving each frame of RTS, CTS, and ACK.

The DATA frames to which bursting technology is applied are continuously transmitted in the time direction as the plurality of frames 1 to K with an inter-frame space of a predetermined length sandwiched between frames. If frame efficiency is considered, the inter-frame space is preferably shorter. However, if the inter-frame space and the symbol length inside a frame are different, it is necessary for the receiver side to adjust the timing of reception processing by fitting to a difference between the inter-frame space and the symbol length to avoid interference between symbols.

In IEEE802.11n, while the symbol length is 4 ms, the reduced IFS (RIFS) inserted between consecutive frames in the time direction by bursting is 2 ms and thus, it is necessary to adjust the timing of reception processing.

Next, a method of adjusting the timing of reception processing of consecutive frames in the time direction will be described with reference to FIGS. 5A to 5C. Each of a frame 1 and a frame 2 in these figures is composed of one or more symbols of a predetermined symbol length. It is also assumed in examples shown in these figures that a defined inter-frame space is shorter than the symbol length.

Figure 5A:
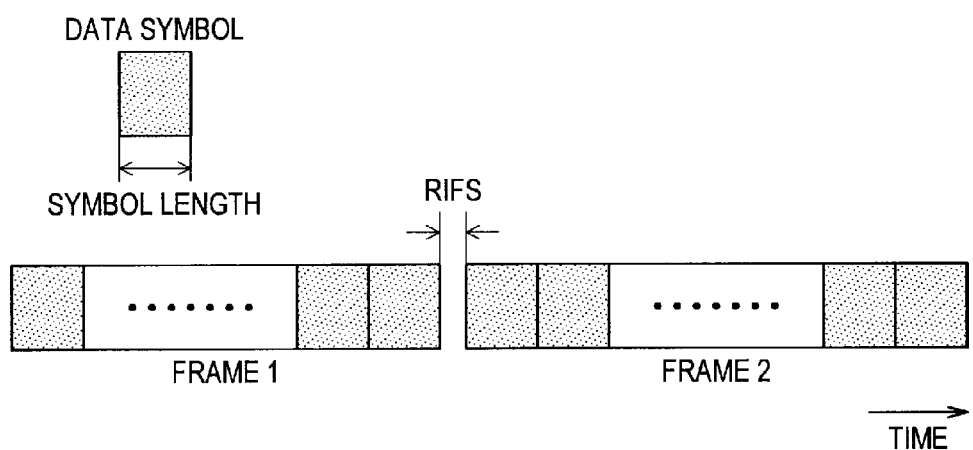
FIG. 5A is a diagram illustrating a case where only an inter-frame space is simply inserted between two consecutive frames in a time direction.

FIG. 5A illustrates a case in which only an inter-frame space is simply inserted between the two consecutive frame 1 and frame 2 in the time direction. While a zero IFS (ZIFS) is used between consecutive frames using the same transmission power for immediate transmission (not shown) in IEEE802.11, a reduced IFS (RIFS) is used when transmission power changes between consecutive frames. Because the symbol length is 4 ms, but the RIFS is 2 ms in IEEE802.11n, the inter-frame space remains different from the symbol length.

Figure 5B:
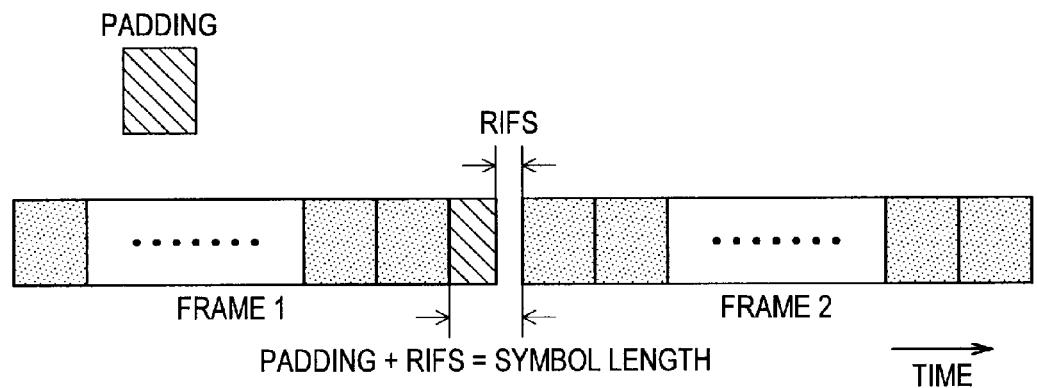
FIG. 5B is a diagram showing how padding is added to a backward portion of a prior frame of frames transmitted continuously.
Figure 5C:
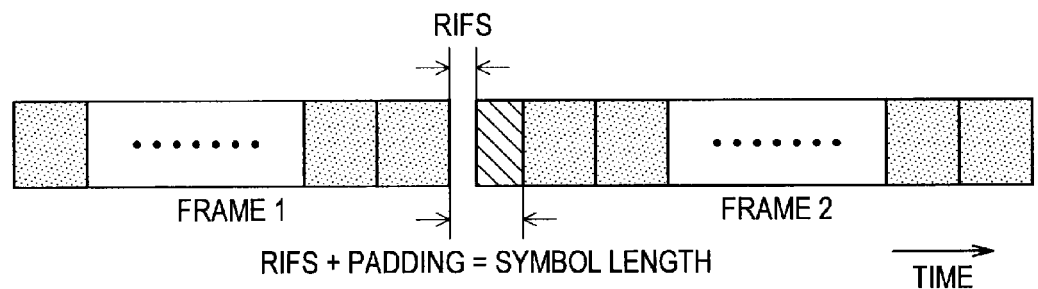
FIG. 5C is a diagram showing how padding is added to a forward portion of a subsequent frame of frames transmitted continuously.

In FIGS. 5B and 5C, by contrast, the timing of reception processing of the subsequent frame is adjusted by adding padding between two frames continuously transmitted in the time direction.

FIG. 5B shows how padding is added to a backward portion of a prior frame (the frame 1 in FIG. 5B) of frames transmitted continuously. By adding padding to the backward portion of the prior frame, the interval between the backend of the frame 1 and the front of the frame 2 can be adjusted to the length of the padding+inter-frame space. FIG. 5B is an example in which the length of padding is adjusted so that the interval between the backend of the frame 1 and the front of the frame 2 becomes equal to the symbol length. Accordingly, the symbol timing between frames can be maintained aligned even after bursting is performed.

In contrast to FIG. 5B, FIG. 5C shows how padding is added to a forward portion of a subsequent frame (the frame 2 in FIG. 5C) of frames transmitted continuously. By adding padding to the forward portion of the subsequent frame, like in FIG. 5B, the interval between the backend of the frame 1 and the front of the frame 2 can be adjusted to the length of the padding+inter-frame space. FIG. 5C is an example in which the length of padding is adjusted so that the interval between the backend of the frame 1 and the front of the frame 2 becomes equal to the symbol length. Accordingly, the symbol timing between frames transmitted temporally continuously can be maintained aligned even after bursting is performed.

The timing of frame reception processing by padding is ideally adjusted in such a way that the length of padding+inter-frame space becomes equal to the symbol length or an integral multiple of the symbol length. This is because, as is evident from FIGS. 5B and 5C, the symbol timing between frames transmitted temporally continuously can thereby be maintained aligned.

Further, as is evident from FIGS. 5B and 5C, the position of padding is preferably a position contiguous to the inter-frame space inserted between temporarily continuous frames. This is because, at other positions, excessive padding will be added to align the symbol timing.

According to embodiments, the padding information inserted between two consecutive frames is a predetermined pattern. As an example, a pre-determined pattern between transmission and reception may be used as a pattern used for padding or a pattern used for the inter-frame space. If a pattern known to these fields is used, by using the known pattern as a pilot for performing reception processing of frames, the pattern can be reused as an aid to a reception operation such as frequency error estimation, timing error estimation, and channel estimation.

In an existing WLAN system including that of IEEE802.11, an inter-frame space is an interval of no signal (null). In such a case, a null pattern may also be used for padding.

Frame sequence examples in FIGS. 5A to 5C are drawn as if an inter-frame space is no signal. By contrast, a signal of a predetermined pattern (that is not no signal) may also be used as an inter-frame space. In such a case, a pattern different from that of padding may be used or the same pattern as that of the padding may be used.

The pattern used for padding may be decided by associating with the inter-frame space. Instead of providing separate patterns for each of the inter-frame space and padding, another symbol pattern with reference to the symbol length may be provided to substitute for the interval of the inter-frame space+padding.

Figure 6A:
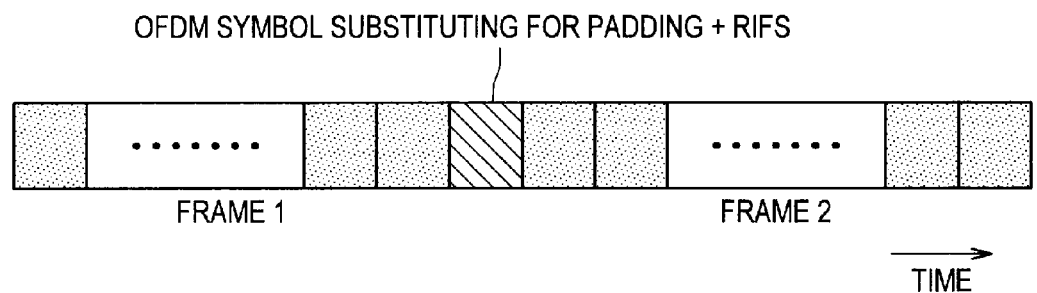
FIG. 6A is a diagram showing how one OFDM symbol is used as an alternative to an interval of an inter-frame space+ padding when bursting is used.

In the case of, for example, IEEE802.11n that applies the OFDM modulation method, the OFDM symbol length is 4 ms (including the guard interval). If, by contrast, the reduced IFS (RIFS) of 2 ms is used for bursting, padding of 2 ms is needed to match the inter-frame space+padding to the symbol length. Instead of separately providing inter-frame space and padding, as shown in FIG. 6A, a pattern with reference to one OFDM symbol can be used as an alternative to the interval of the inter-frame space+padding. An alternative pattern to the pattern with reference to the illustrated OFDM symbol may be a null pattern.

Figure 6B:
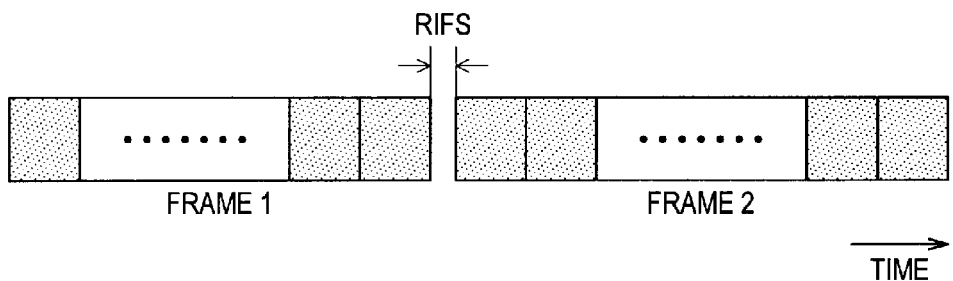
FIG. 6B is a diagram illustrating a method of adjusting the length itself of the inter-frame space inserted between consecutive frames when bursting is used.
Figure 6C:
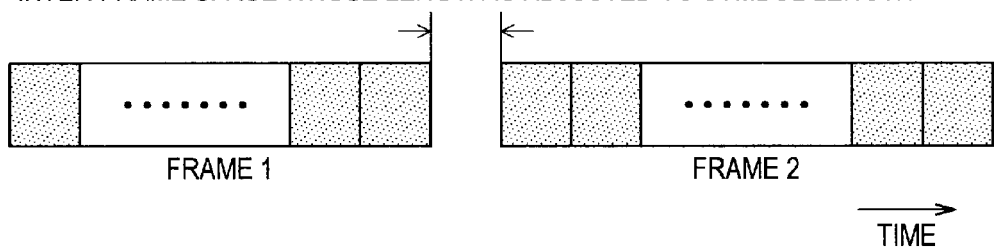
FIG. 6C is a diagram illustrating a method of adjusting the length itself of the inter-frame space inserted between consecutive frames when bursting is used.

A method of adjusting the length itself of an inter-frame space can be considered as still another method of adjusting the length among frames when a plurality of frame is continuously transmitted in the time direction. FIG. 6B shows how an inter-frame space before length adjustments (that is, the RIFS of the length as defined by IEEE802.11n) is inserted when the frames 1 and 2 are continuously transmitted in the time direction. By contrast, FIG. 6C shows how the length of the inter-frame space is adjusted when the frames 1 and 2 are continuously transmitted in the time direction. In FIG. 6C, the length of the inter-frame space is adjusted so that the interval between the backend of the frame 1 and the front of the frame 2 becomes equal to the length of the symbol length. Accordingly, like examples shown in FIGS. 5B, 5C, and 6A, the symbol timing between frames can be maintained aligned even after bursting is performed.

The timing of frame reception processing by the inter-frame space, as shown in FIG. 6C, is ideally adjusted in such a way that the length of the inter-frame space becomes equal to the symbol length or an integral multiple of the symbol length. This is because, as is evident from FIG. 6C, the symbol timing between frames transmitted temporally continuously can thereby be maintained aligned.

Here, the unit called "symbol" described herein and used as the reference for insertion between frames will be mentioned. Heretofore, for convenience sake, the unit called "symbol" has been described, like OFDM, as an OFDM symbol block unit in which a plurality of subcarriers is modulated, but subject matter of the present invention is not limited to this. For example, symbols generated by modulation (primary modulation) such as PSK and QAM and PSK or QAM symbols in a plurality of block units like a single carrier FDMA (SC-FDMA) are assumed to be included. For blocks such as OFDM and SC-FDMA, counting an additional signal specific to the modulation method such as a guard interval and cyclic prefix together as symbols may also be considered. Accordingly, the reception method can be simplified by aligning the OFDM symbol length including the guard interval length even if, for example, a plurality of guard interval modes of 0.8 ms and 0.4 ms is present like IEEE802.11n. In a word, the symbol is an optional basic unit constituting a frame.

Adjustments of the length among frames by padding and the inter-frame space described above when a plurality of frames is continuously transmitted in the time direction have the same purpose to align the symbol timing between frames. Hereinafter, the description will continue by taking adjustments by padding as an example.

FIGS. 5B and 5C show examples in which padding is added to a plurality of frames addressed to a single user when the frames are continuously transmitted in the time direction. Next, padding to frames when frames addressed to a plurality of users are multiplexed at the same time and a plurality of frames is continuously transmitted on the time axis will be described with reference to FIGS. 7A to 7C. For convenience in description, however, it is assumed that the number of frames to be multiplexed at the same time (that is, the total number of users to be multiplexed) is two in each of FIGS. 7A to 7C and while a single frame 1 that does not use bursting is transmitted to one user 1 (or a plurality of frames is continuously transmitted in the time direction by using ZIFS), a plurality of frames 2 and 3 is continuously transmitted to the other user 2 on the time axis by using bursting. Each of the frames 1 to 3 is composed of one or more data symbols having a predetermined symbol length. It is also assumed that the defined inter-frame space is shorter than the symbol length.

Figure 7A:
FIG. 7A is a diagram illustrating a case where only the inter-frame space is simply inserted between two consecutive frames in the time direction when a plurality of frames for the other user is burst.
Figure 7A:
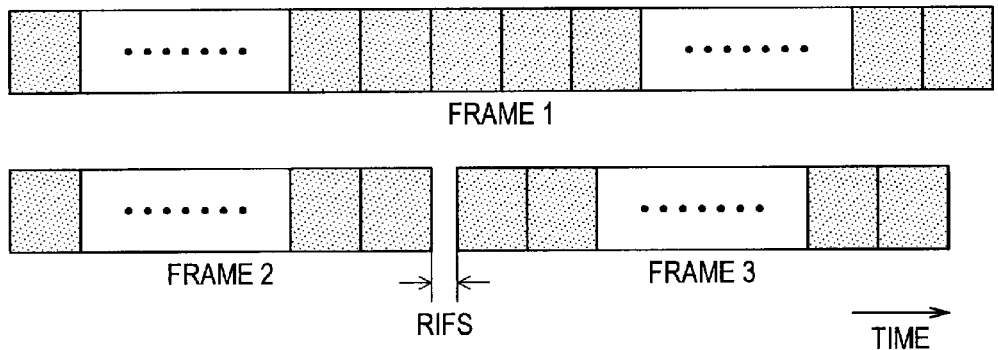

FIG. 7A illustrates a case where only an inter-frame space is simply inserted between two consecutive frames in the time direction when the plurality of frames 2 and 3 for the other user 2 is burst. In this case, the symbol length is 4 ms, but the RIFS is 2 ms in IEEE802.11n and thus the inter-frame space remains different from the symbol length. Moreover, the symbol timing is shifted between the frame 1 and the frame 3 multiplexed at the same time. Thus, interference between symbols will occur on the receiver side so that it is difficult to maintain superb reception quality as long as no special demodulation method is used on the receiver side.

According to embodiments, when two consecutive frames are associated with a first user, and the two consecutive frames are multiplexed with a frame associated with a second user, a sum of the length of the two consecutive frames, the first user padding information, and the reduced inter-frame space is equal to a length of the frame associated with the second user. For example, in FIGS. 7B and 7C, the timing of reception processing of the subsequent frame is adjusted by adding padding between the two frames 2 and 3 continuously transmitted in the time direction when the plurality of frames 2 and 3 for the other user 2 is burst so that the symbol timing is aligned among frames multiplexed at the same time.

Figure 7B:
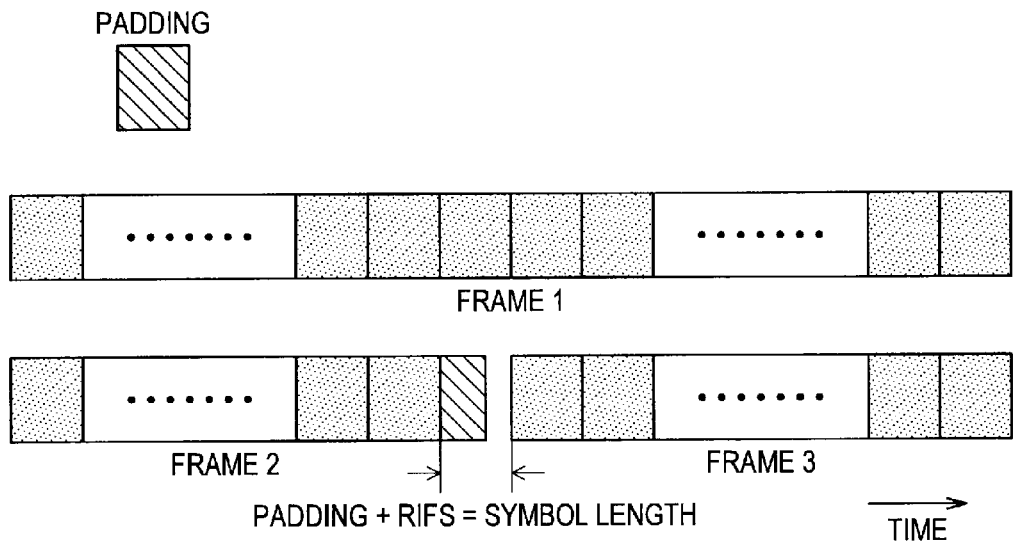
FIG. 7B is a diagram showing how padding is added to the backward portion of the prior frame of frames transmitted continuously when the plurality of frames for the other user is burst.

FIG. 7B shows how padding is added to the backward portion of the prior frame 2 of frames transmitted continuously when the plurality of frames 2 and 3 for the other user 2 is burst. By adding padding to the backward portion of the prior frame 2, the interval from the backend of the frame 2 to the front of the frame 3 immediately thereafter is adjusted to the length of padding+inter-frame space. If the length of padding+inter-frame space is aligned with the symbol length, the symbol timing is aligned between the frame 1 and the frame 3 multiplexed at the same time. Therefore, superb reception quality can be maintained on the receiver side without an occurrence of interference between symbols on the receiver side.

Figure 7C:
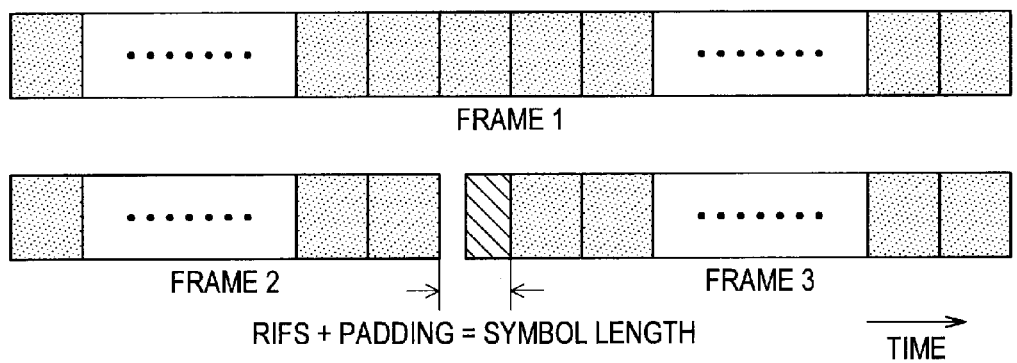
FIG. 7C is a diagram showing how padding is added to the forward portion of the subsequent frame of frames transmitted continuously when the plurality of frames for the other user is burst.

In contrast to FIG. 7B, FIG. 7C shows how padding is added to the forward portion of the subsequent frame (the frame 3 in FIG. 7C) of frames transmitted continuously when the plurality of frames and for the other user is burst. By adding padding to the forward portion of the subsequent frame, the interval from the backend of the frame 2 to the front of the frame 3 is adjusted to the length of padding+inter-frame space. If the length of padding+inter-frame space is aligned with the symbol length, the symbol timing is aligned between the frame 1 and the frame 3 multiplexed at the same time. Therefore, superb reception quality can be maintained on the receiver side without an occurrence of interference between symbols on the receiver side.

Also when frames addressed to a plurality of users are multiplexed at the same time, like the examples shown in FIGS. 5B and 5C, adjustments by padding when a plurality of frames is burst are demanded to be made so that the length of inter-frame space+padding becomes equal to the symbol length or an integral multiple of the symbol length. Further, as is evident from FIGS. 7B and 7C, the position of padding is demanded to be a position contiguous to the inter-frame space inserted between frames. This is because, at other positions, excessive padding will be added to align the symbol timing.

Also when frames addressed to the plurality of users are multiplexed at the same time, like the examples shown in FIGS. 5B and 5C, a pre-decided pattern between transmission and reception may be used as a pattern used for padding or a pattern used for the inter-frame space. In a WLAN system, the inter-frame space is an interval of no signal (null). In such a case, a null pattern may also be used for padding.

A signal of a predetermined pattern (that is not no signal) may also be used as an inter-frame space. In such a case, a pattern different from that of padding may be used or the same pattern as that of the padding may be used. That is, the pattern used for padding may be decided by associating with the inter-frame space. Instead of providing separate patterns for each of the inter-frame space and padding, another symbol pattern with reference to the symbol length may be provided to substitute for the interval of the inter-frame space+padding. The alternative symbol pattern may be a null pattern.

If patterns other than a null pattern are used for the inter-frame space and padding, power can be maintained at a fixed level throughout a frame. This will be useful when reception power is measured by using a whole frame on the receiver side.

Figure 8A:
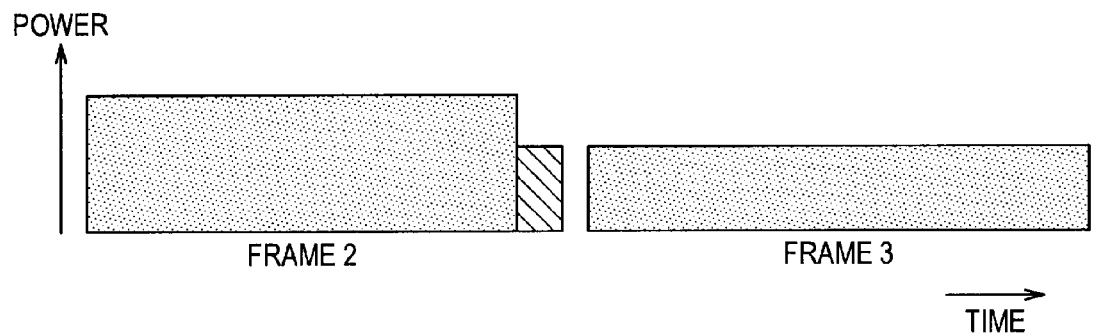
FIG. 8 is a diagram illustrating a relation between frames and power of padding when padding is inserted between frames transmitted continuously by bursting.

FIG. 8 illustrates a relation between frames and power of padding when, as shown in FIG. 7B, padding is inserted between the frame 2 and the frame 3 transmitted continuously by bursting.

Figure 8B:
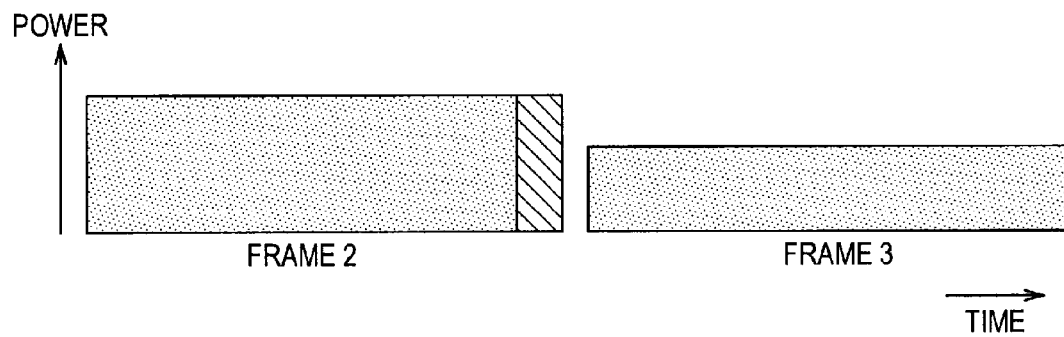

In the example shown in FIG. 7B, when bursting the frames 2 and 3, padding is added to the backward portion of the prior frame 2 of the frames transmitted continuously. For the frame to which padding is added, as shown in FIG. 8B, it is desirable that the average power in the interval in which padding is added be the same as that in the interval of a frame body to which padding is added. By using the same average power, it becomes possible to relieve instability of operation of AGC on the receiver side. Also by using the same average power, when the receiver side measures reception power of a signal in the whole frame, precision of measurement is improved. There is no limitation on power between different frames.

When bursting the frames 2 and 3, as shown in FIG. 7C, though an illustration thereof is omitted in FIG. 8, it is similarly desirable that the average power in the interval in which padding is added be the same as that in the interval of a frame body to which padding is added also when padding is added to the forward portion of the subsequent frame 3 of the frames transmitted continuously.

This also applies, though an illustration thereof is omitted, when a pattern that is not null is used for an inter-frame space inserted between consecutive frames during bursting. That is, instability of operation of AGC can be relieved on the receiver side by using the same average power for an inter-frame space composed of a pattern other than null and at least one frame of frames prior to and subsequent to the inter-frame space as a whole. Moreover, when the receiver side measures reception power of a signal in the whole frame, precision of measurement is improved by using the same average power.

As described in [Background Art], even if the original transmission data length of each frame (that is, for each user) to be multiplexed varies in a radio communication system in which a plurality of frames is multiplexed at the same time and transmitted, it is necessary to transmit the frames in the end with the same frame length. Though the length of each frame to be multiplexed has not been discussed heretofore, when a plurality of frames is continuously transmitted in the time direction by bursting, it is necessary, like when the length among consecutive frames in the time direction is aligned as described above, to transmit the frames in the end with the same frame length.

A method of making the frame length of each frame (that is, for each user) to be multiplexed at the same time equal and aligning the length among consecutive frames in the time direction with the symbol length will be described with reference to FIG. 9. While a plurality of frames is multiplexed at the same time by space division multiplexing in the present embodiment, one of space division multiplexing, code division multiplexing, frequency division multiplexing, and orthogonal frequency division multiplexing or a combination of two or more thereof may be used for multiplexing a plurality of frames at the same time.

Figure 9A:
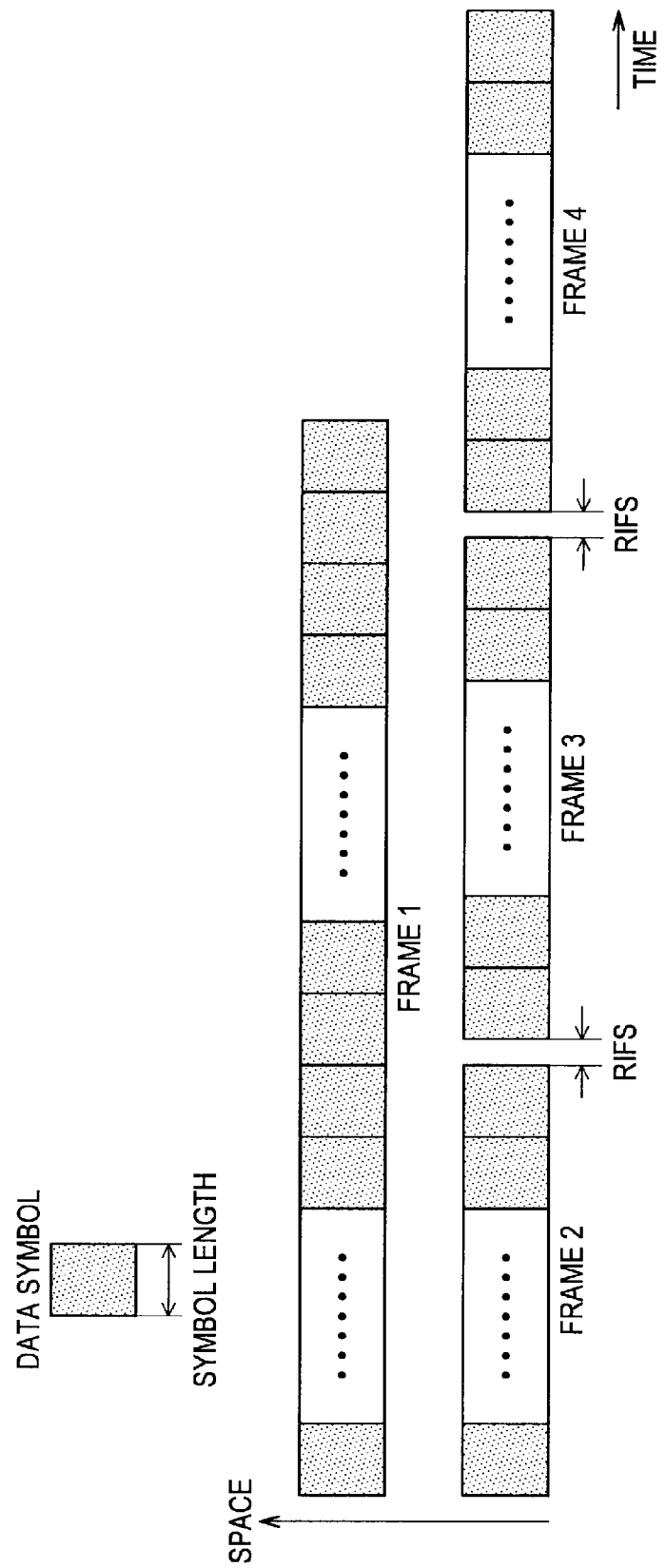
FIG. 9A is a diagram illustrating the method of making the frame length of each frame multiplexed at the same time equal and aligning the length among consecutive frames in the time direction with the symbol length.

Here, it is assumed that, as shown in FIG. 9A, the number of frames to be multiplexed at the same time (that is, the total number of users to be multiplexed) is two and while a single frame 1 that does not use bursting is transmitted to one user 1 (or a plurality of frames is continuously transmitted in the time direction by using ZIFS), a plurality of frames 2, 3, and 4 is continuously transmitted to the other user 2 on the time axis by using bursting. It is also assumed that the defined inter-frame space is shorter than the symbol length.

In the example shown in FIG. 9A, the whole frame length after bursting the plurality of frames 2, 3, and 4 for the other user 2 is longer than the frame length of the frame 1 to be transmitted to the one user 1. Thus, there are problems such as inducing an unstable operation of AGC accompanying an abrupt change of reception power when the frame 4 is received on the receiver side.

Also in the example shown in FIG. 9A, an inter-frame space is simply inserted between two consecutive frames in the time direction when the plurality of frames 2, 3, and 4 is burst for the other user 2. In this case, the symbol length is 4 ms, but the reduced IFS (RIFS) is 2 ms in IEEE802.11n and thus, the inter-frame space remains different from the symbol length. Moreover, the symbol timing is shifted between the frame 1 and the frame 3 multiplexed at the same time. Thus, interference between symbols will occur on the receiver side so that it is difficult to maintain superb reception quality as long as no special demodulation method is used on the receiver side.

According to embodiments, when a plurality of frames include a set of frames associated with a first user, and a frame associated with a second user, the data processing units 29 or 49 adds first user padding information between each consecutive frames included in the set of frames to form a reduced inter-frame space between the first user padding information and a frame from each of the consecutive frames not including the first user padding information. Further, the data processing units 29 or 49 add second user padding information to the frame associated with the second user so that a sum of the length of the frame associated with the second user and the second user padding information is equal to a sum of the length of each frame included in the set of frames associated with the first user, each corresponding first user padding information, and each corresponding reduced inter-frame space.

Figure 9B:
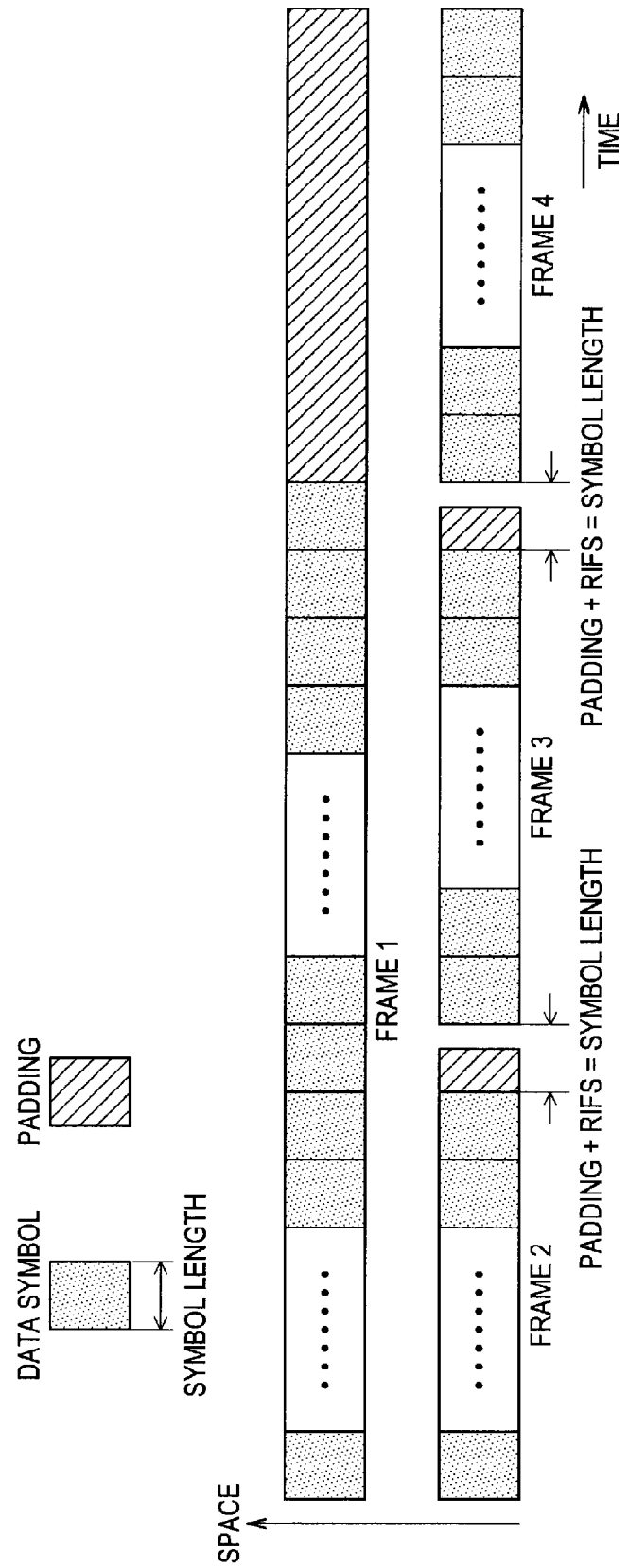
FIG. 9B is a diagram illustrating the method of making the frame length of each frame multiplexed at the same time equal and aligning the length among consecutive frames in the time direction with the symbol length.

In the example shown in FIG. 9B, padding is added to the backward portion of the prior frame 2 of the frames 2 and 3 that are continuously transmitted and padding is added to the backward portion of the prior frame 3 of the frames 3 and 4 that are continuously transmitted when the plurality of frames 2, 3, and 4 for the other user 2 is burst. If the interval from the backend of the forward frame to the front of the frame immediately thereafter is adjusted to the length of padding+inter-frame space to align with the symbol length by adding padding to the backward portion of the prior frame, the symbol timing is aligned between the frame 1 and the frame 3 and between the frame 1 and the frame 4 multiplexed in the same timing. Therefore, superb reception quality can be maintained on the receiver side without an occurrence of interference between symbols on the receiver side.

Though an illustration is omitted, if padding is added to the forward portion of the subsequent frame, instead of adding padding to the backward portion of the prior frame, the symbol timing can be aligned among frames to be multiplexed at the same time by adjusting the interval from the backend of the forward frame to the front of the frame immediately thereafter to the length of padding+inter-frame space to align with the symbol length.

Also in the example shown in FIG. 9B, by adding padding to the backward portion of the frame 1 transmitted to the one user 1, the plurality of frames 2, 3, and 4 for the other user 2 is made equal to the whole burst frame length. Accordingly, reception power will not abruptly change on the side receiving multiplexed frames so that instability of AGC can be eliminated.

To sum up, according to the method shown in FIG. 9B, power of whole frames after bursting can be maintained constant while aligning the symbol timing between frames multiplexed at the same time. Therefore, frames can be received in a more favorable form on the receiver side.

Figure 15A:
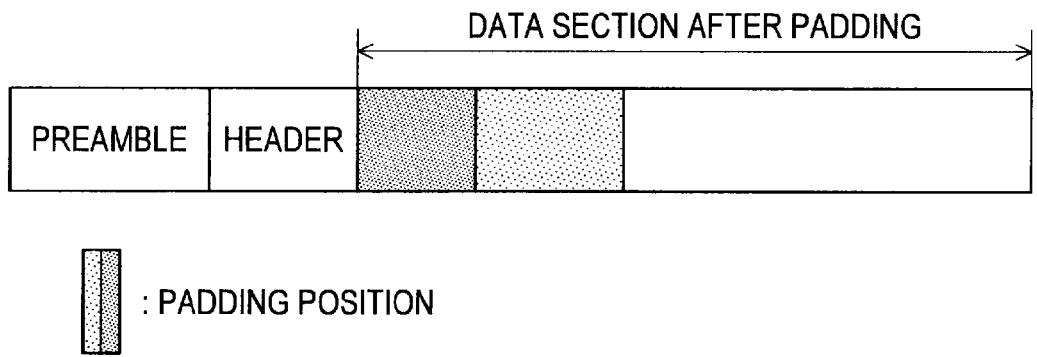
FIG. 15A is a diagram showing an arrangement example for adding padding within a frame and, more specifically, a diagram showing how a padding area is arranged together in a front portion of a data section.
Figure 15B:
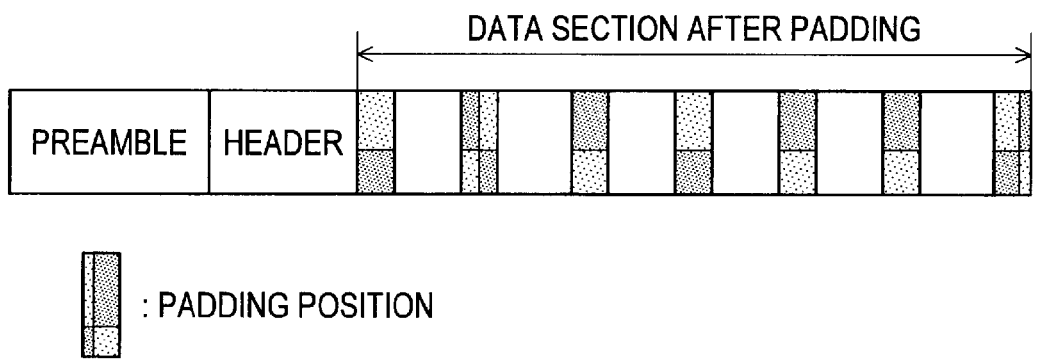
FIG. 15B is a diagram showing an arrangement example for adding padding within a frame and, more specifically, a diagram showing how a padding area is distributed and arranged uniformly throughout the data section by finely dividing a padding area.
Figure 15C:
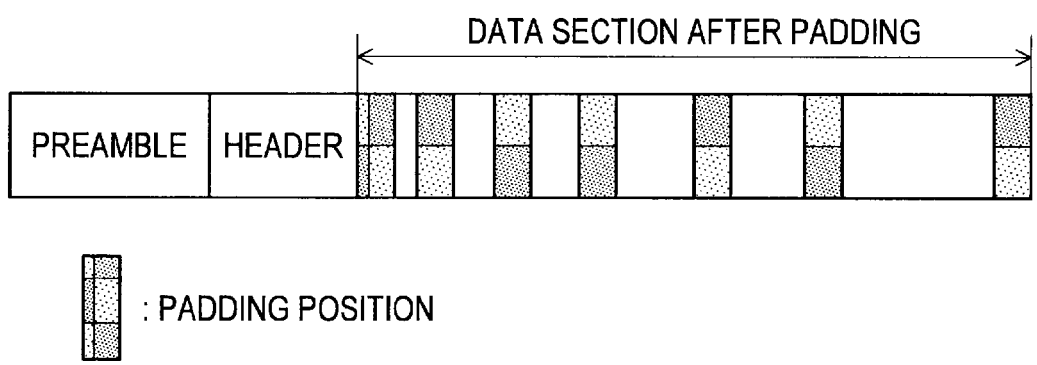
FIG. 15C is a diagram showing an arrangement example for adding padding within a frame and, more specifically, a diagram showing how a padding area is distributed and arranged non-uniformly throughout the data section by finely dividing the padding area.

It is assumed in FIG. 9B that the plurality of frames multiplexed at the same time includes, for example, both a plurality of frames multi-transmitted from an access point to each of a plurality of terminal stations through a downlink and a plurality of frames multi-transmitted from each of the plurality of terminal stations to the access point. For example, as shown in FIG. 15A, a method of adding padding to the forward portion of a data section, as shown in FIG. 15B, a method of distributing and arranging padding uniformly throughout the data section by finely dividing a padding area and, as shown in FIG. 15C, a method of distributing and arranging padding non-uniformly throughout the data section by finely dividing the padding area can be mentioned. For advantages of each padding method, see, for example, specifications of Japanese Patent Application No. 2009-113868 transferred to the present applicant.

The example in FIG. 9B shows padding to the backward portion of frames to adjust the frame length, but the subject matter of the present invention is not limited to this.

Figure 10:
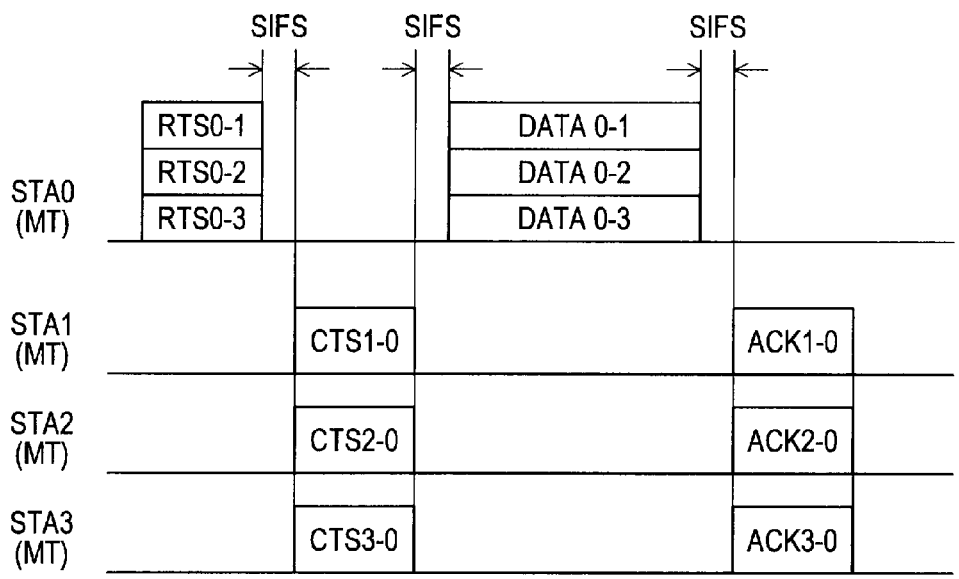
FIG. 10 is a diagram showing a frame sequence example in which data frames of a downlink from an access point to a plurality of terminal stations are multiplexed at the same time.

FIG. 10 shows a frame sequence example in which data frames of a downlink from an access point to a plurality of terminal stations are multiplexed at the same time. Here, the communication system shown in FIG. 1 is assumed: the communicating station STA0 operating as an access point becomes a data source, each of the communicating stations STA1 to STA3 operating as a terminal station becomes a data destination, and STA0 multiplexes data frames addressed to each of the communicating stations STA1 to STA3 at the same time.

STA0 makes sure that a medium is clear by performing a physical carrier sense in advance and, after further backing off, multiplexes at the same time and transmits a plurality of RTS frames (RTS0-1, RTS0-2, and RTS0-3) addressed to each of the communicating stations STA1 to STA3 by using the weight of an adaptive array antenna.

If each of the communicating stations STA1, STA2, and STA3 recognizes that the received RTS frame is addressed to the local station, when a predetermined inter-frame space (SIFS) passes after reception completion of the frames, each of the communicating stations STA1, STA2, and STA3 multiplexes CTS frames (CTS1-0, CTS2-0, and CTS3-0) addressed to STA0, an RTS source, at the same time to transmit the CTS frames.

After transmission completion of RTS frames, STA0 waits to receive CTS frames returned from each of the addressed stations of the RTS frames. Then, when the predetermined inter-frame space (SIFS) passes after reception completion of the CTS frames from each of the communicating stations STA1, STA2, and STA3, STA0 multiplexes at the same time and transmits data frames (DATA1-0, DATA2-0, and DATA3-0) addressed to each of the communicating stations STA1, STA2, and STA3. Accordingly, throughput can be improved for a plurality of users as a whole.

If each of the communicating stations STA1, STA2, and STA3 completes reception of the data frame (DATA1-0, DATA2-0, or DATA3-0) addressed to the local station, after the predetermined inter-frame space (SIFS) passes, each of the communicating stations STA1, STA2, and STA3 multiplexes ACK frames (ACK0-1, ACK0-2, and ACK0-3) at the same time to transmit the ACK frames.

Then, with reception of each ACK frame from each of the communicating stations STA1, STA2, and STA3, STA0 successfully completes a data transmission sequence of downlink from STA0.

In the frame sequence example shown in FIG. 10, STA0 can improve frame efficiency by applying bursting to at least a portion of a plurality of data frames (DATA1-0, DATA2-0, and DATA3-0) multiplexed at the same time. When bursting is used, padding is inserted between consecutive frames in the time direction sandwiching a reduced IFS (RIFS) when appropriate so that the symbol timing is aligned among frames multiplexed at the same time. STA0 also adds padding to each frame so that the frame length of frames multiplexed at the same time becomes equal. Accordingly, instability of operation of AGC can be eliminated on the side of each of the communicating stations STA1 to STA3 and also frames multiplexed at the same time can be received by a simple demodulation method.

Figure 11:
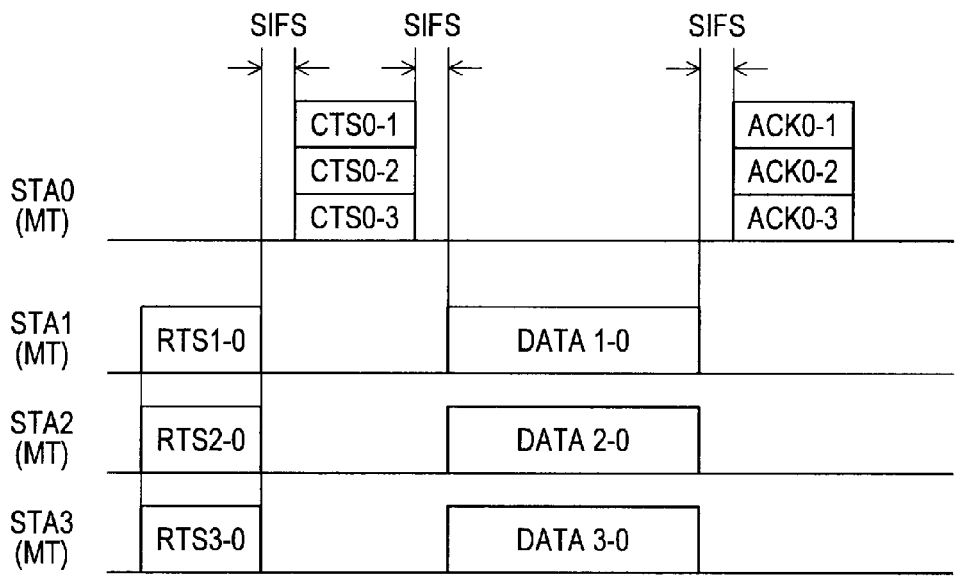
FIG. 11 is a diagram showing a frame sequence example in which data frames of an uplink from the plurality of terminal stations to the access point are multiplexed at the same time.

FIG. 11 shows a frame sequence example in which data frames of an uplink from the plurality of terminal stations to the access point are multiplexed at the same time. Here, the communication system shown in FIG. 1 is assumed: each of the communicating stations STA1 to STA3 operating as a terminal station becomes a data source, the communicating station STA0 operating as an access point becomes a data destination, and each of the communicating stations STA1 to STA3 multiplexes data frames addressed to STA0 at the same time.

Each of the communicating stations STA1 to STA3 makes sure that a medium is clear by performing a physical carrier sense in advance and, after further backing off, multiplexes at the same time and transmits RTS frames (RTS1-0, RTS2-0, and RTS3-0) addressed to STA0.

If STA0 recognizes that each received RTS frame is addressed to the local station, when the predetermined inter-frame space (SIFS) passes after reception completion of the frames, STA0 multiplexes a plurality of CTS frames (CTS0-1, CTS0-2, and CTS0-3) addressed to the communicating stations STA1 to STA3 respectively to transmit the CTS frames.

After transmission completion of RTS frames, each of the communicating stations STA1 to STA3 waits to receive CTS frames returned from STA0 that is the addressed station of the RTS frames. Then, in response to reception of the CTS frame from STA0, each of the communicating stations STA1, STA2, and STA3 multiplexes data frames (DATA1-0, DATA2-0, and DATA3-0) addressed to STA0 at the same time to transmit the data frames. Accordingly, throughput can be improved for a plurality of users as a whole.

When the predetermined inter-frame space (SIFS) passes after reception completion of the data frames (DATA1-0, DATA2-0, and DATA3-0) from each of the communicating stations STA1, STA2, and STA3, STA0 multiplexes a plurality of ACK frames (ACK0-1, ACK0-2, and ACK0-3) addressed to the communicating stations STA1 to STA3 respectively at the same time to transmit the ACK frames.

Then, with reception of the ACK frames from STA0, each of the communicating stations STA1, STA2, and STA3 successfully completes a data transmission sequence of uplink to STA0.

In the frame sequence example shown in FIG. 11, each of the communicating stations STA1, STA2, and STA3 can improve frame efficiency by applying bursting to its data frames (DATA1-0, DATA2-0, and DATA3-0) mutually multiplexed at the same time. When bursting is used, padding is inserted between consecutive frames in the time direction sandwiching a reduced IFS (RIFS) when appropriate so that the symbol timing is aligned among frames multiplexed at the same time. Each of the communicating stations STA1, STA2, and STA3 also adds padding to its frame when appropriate so that the frame length of frames mutually multiplexed at the same time becomes equal. Accordingly, instability of operation of AGC can be eliminated on the side of the access point STA0 that receives these data frames and also frames multiplexed at the same time can be received by a simple demodulation method.

Incidentally, in the frame sequence example shown in FIG. 11, it is necessary for each of the communicating stations STA1, STA2, and STA3 to mutually know frames of the final frame length before each data frame (DATA1-0, DATA2-0, and DATA3-0) being transmitted. Methods therefor include a method of having the frame length specified by the access point STA0 when a transmission request (RTS) frame and a reception preparation (CTS) frame are exchanged and a method of adopting a fixed frame length as a system only in the direction of transmission to the access point STA0.

When the access point STA0 specifies the frame length for each of the communicating stations STA1, STA2, and STA3, it is desirable to specify the frame length appropriate for transmission of the maximum amount of transmission data in consideration of the amount of transmission data requested by each of the communicating stations STA1, STA2, and STA3.

Incidentally, frame sequence examples shown in FIGS. 10 and 11 do not limit the transmission/reception method of each frame of RTS, CTS, and ACK.

It is desirable that the padding position where padding is added to frames continuously transmitted in the time direction or frames multiplexed at the same time be prearranged between the transmitting and receiving sides. If the padding position is not fixed throughout the system, it becomes necessary for a communication apparatus that receives padded frames to recognize the padding position for each frame time. In such a case, one solution is to notify the destination communication apparatus of information about the padding position from the communication apparatus that transmits frames.

As a notification method, information about the padding position is inserted into a preamble added to a frame transmitted in the end or into the header to be able to make a notification.

If padding is added to the forward portion or backward portion of a frame, the padding position is made identifiable by making a notification of the frame length before padding and that after padding.

Figure 12:
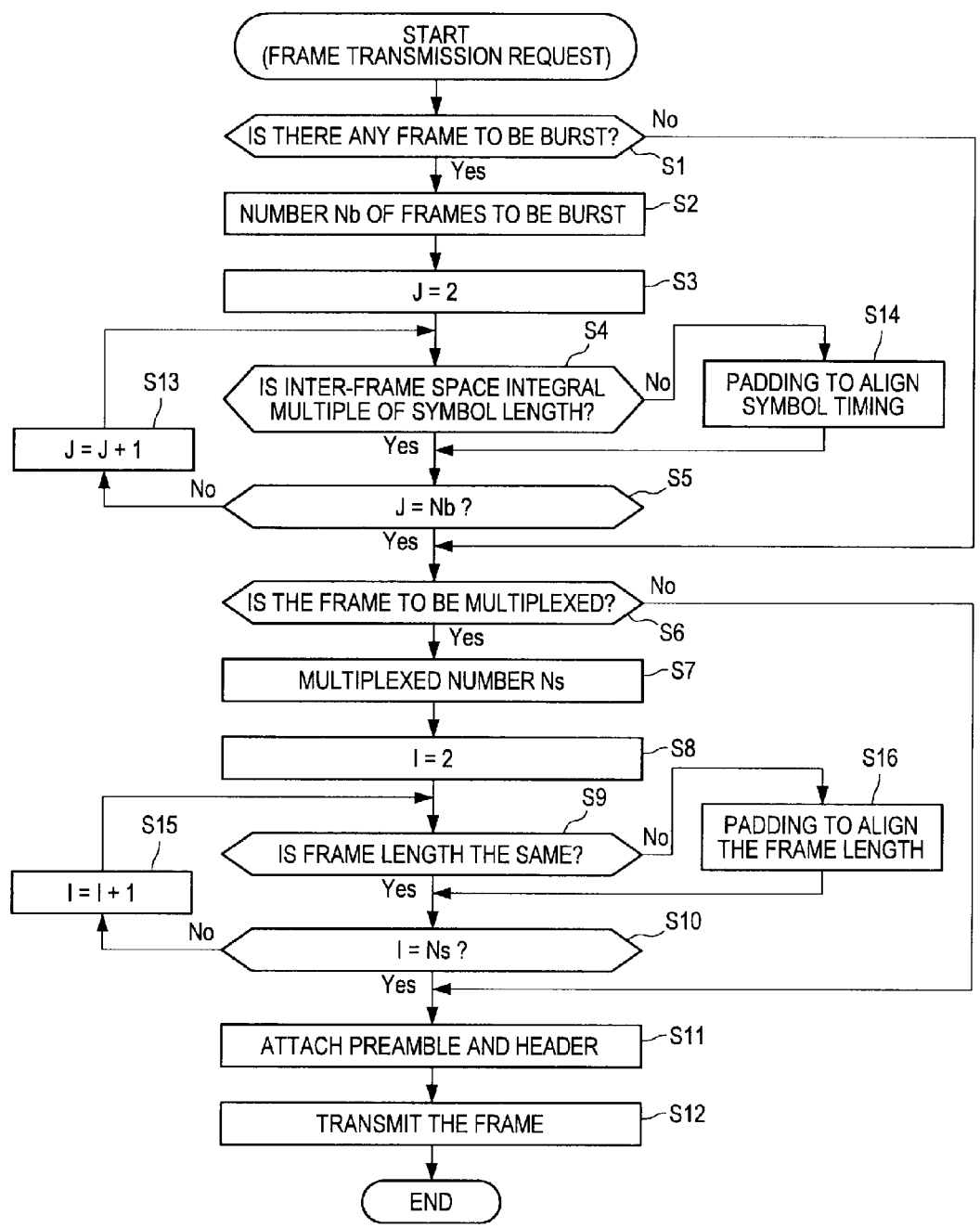
FIG. 12 is a flow chart showing a processing procedure when the communication apparatus multiplexes frames addressed to a plurality of users at the same time.

FIG. 12 shows a processing procedure for adding padding to frames when the communication apparatus multiplexes frames addressed to a plurality of users at the same time in the form of a flow chart. In the frame sequence example shown in FIG. 10, for example, STA0 operating as an access point performs this processing procedure to multiplex data frames addressed to each of the communicating stations STA1, STA2, and STA3 at the same time.

The processing procedure is activated by, for example, reception of a frame transmission request from an upper layer of the communication protocol by the data processing unit 29 of the communication apparatus shown in FIG. 2. Received transmission frames are temporarily stored in, for example, a buffer (not shown) inside the data processing unit 29.

First, whether there are frames to be burst, that is, to be continuously transmitted in the time direction among transmission requested frames stored in the buffer is checked (step S1). Frame efficiency is improved by continuously transmitting a plurality of frames in the time direction by bursting. However, criteria for determining whether to burst frames are not directly related to the subject matter of the present invention and thus, a description thereof is omitted.

If frames requested to transmit contain those to be burst (Yes in step S1), the total number of frames to be burst is assigned to a variable Nb (step S2) and also a variable J to count the number of processed frames is set to an initial value 2 (step S3) before an unprocessed frame corresponding to the variable J being taken out from the buffer.

Next, whether the inter-frame space to be inserted between consecutive frames in the time direction due to bursting is an integral multiple of the symbol length is checked (step S4).

In IEEE802.11n, for example, while the symbol length is 4 ms, the reduced IFS (RIFS) to be inserted between consecutive frames in the time direction due to bursting is 2 ms, which is not an integral multiple of the symbol length. If the inter-frame space is not an integral multiple of the symbol length (No in step S4), padding of an appropriate length (see, for example, FIGS. 5B and 5C) is added to the forward portion or backward portion of the frame to be burst so that the length of padding+inter-frame space is aligned with an integral multiple of the symbol length (step S14).

Next, whether J has reached Nb, that is, processing to adjust the length of padding+inter-frame space is completed for all frames to be burst is checked (step S5).

If J has not reached Nb, that is, an unprocessed frame to be burst remains (No in step S5), J is incremented by 1 (step S13) before returning to step S4 to repeatedly perform processing to adjust the length of padding+inter-frame space by taking out the next unprocessed frame from the buffer.

If J has reached Nb, that is, processing to adjust the length of padding+inter-frame space is completed for all frames to be burst (Yes in step S5) or frames requested to transmit does not contain any frame to be burst (No in step S1), subsequently whether to multiplex frames requested to transmit at the same time is checked (step S6).

If frames requested to transmit should be multiplexed at the same time (Yes in step S6), the number of frames to be multiplexed at the same time (or the space multiplexed number) is assigned to a variable Ns (step S7) and also a variable I to count the number of processed frames is set to an initial value 2 (step S8) before an unprocessed frame corresponding to the variable I being taken out from the buffer.

Next, whether the frame length of the frame to be processed is equal to a length specified in advance is checked (step S9). If the lengths are not the same (No in step S9), padding is added to the frame to adjust the frame length so that the length becomes equal to the specified length (step S16).

Next, whether I has reached Ns, that is, processing to adjust the frame length is completed for all frames to be multiplexed at the same time is checked (step S10).

If I has not reached Ns, that is, an unprocessed frame to be multiplexed at the same time remains (No in step S10), I is incremented by 1 (step S15) before returning to step S9 to repeatedly perform processing to adjust the frame length among frames to be multiplexed at the same time by taking out the next unprocessed frame from the buffer.

Then, when I reaches Ns, that is, processing to adjust the frame length is completed for all frames to be multiplexed at the same time (Yes in step S10), or frames requested to transmit are not to be multiplexed (No in step S6), a preamble and a header are added (step S11) to complete the frame before transmission processing of the frame being activated (step S12).

Figure 13:
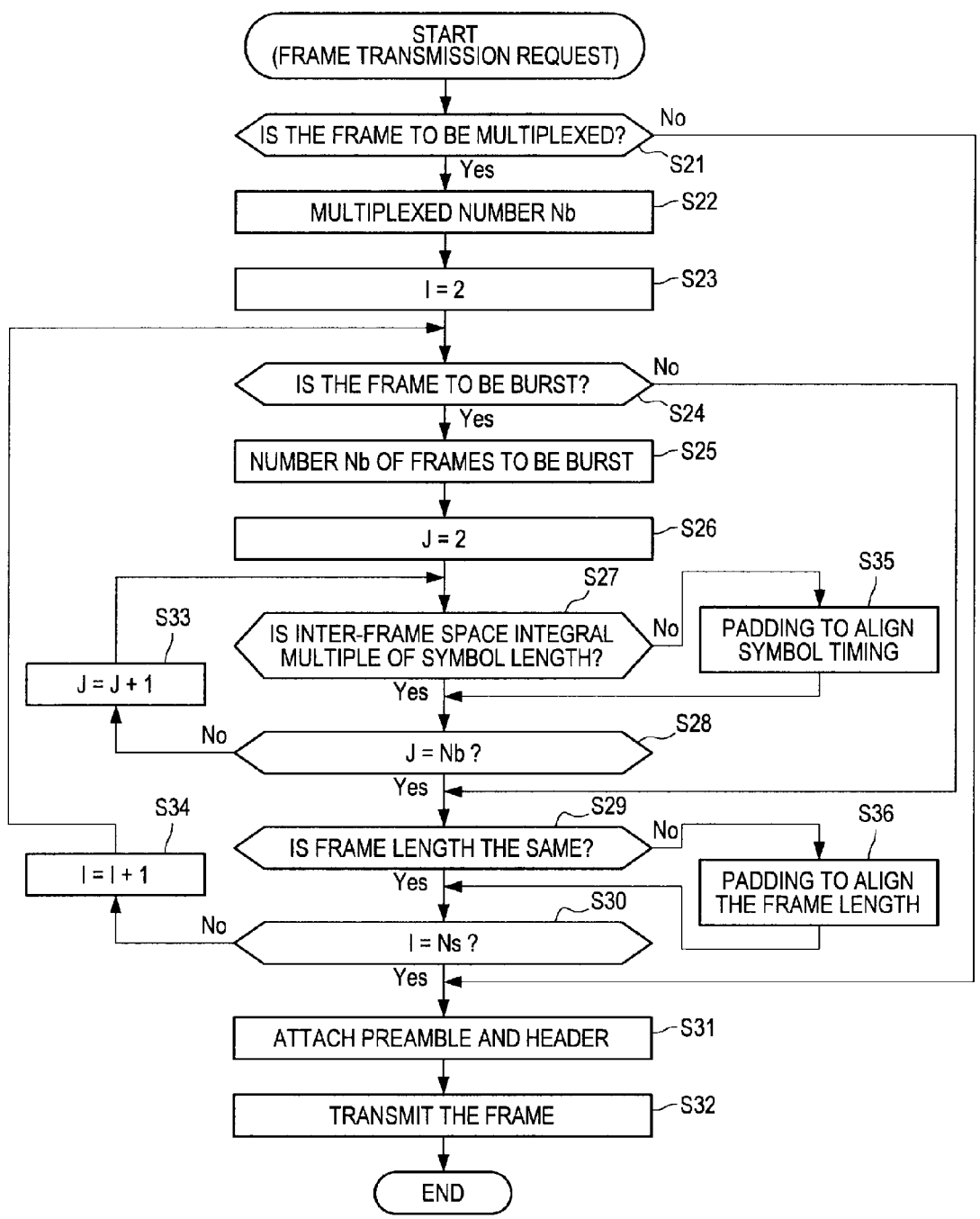
FIG. 13 is a flow chart showing another processing procedure when the communication apparatus multiplexes frames addressed to the plurality of users at the same time.

FIG. 13 shows another example of processing procedure for adding padding to frames when the communication apparatus multiplexes frames addressed to the plurality of users at the same time in the form of a flow chart. The illustrated processing procedure is different from that shown in FIG. 12 in that the order of the determination whether to multiplex frames at the same time and the determination whether to perform bursting is interchanged. In the frame sequence example shown in FIG. 10, for example, STA0 operating as an access point performs this processing procedure to multiplex data frames addressed to each of the communicating stations STA1, STA2, and STA3 at the same time.

The processing procedure is activated by, for example, reception of a frame transmission request from the upper layer of the communication protocol by the data processing unit 29 of the communication apparatus shown in FIG. 2. Received transmission frames are temporarily stored in, for example, the buffer (not shown) inside the data processing unit 29.

First, whether to multiplex frames requested to transmit at the same time is checked (step S21).

If frames requested to transmit should be multiplexed at the same time (Yes in step S21), the number of frames to be multiplexed at the same time (or the space multiplexed number) is assigned to the variable Ns (step S22) and also the variable I to count the number of processed frames is set to the initial value 2 (step S23) before an unprocessed frame corresponding to the variable I being taken out from the buffer.

Next, whether to burst, that is, to continuously transmit in the time direction frames to be processed on the same spatial axes together with one or more frames is checked (step S24).

If frames to be processed should be burst (Yes in step S24), the total number of frames to be burst is assigned to the variable Nb (step S25) and also the variable J to count the number of processed frames is set to the initial value 2 (step S26) before an unprocessed frame corresponding to the variable J being taken out from the buffer.

Then, whether the inter-frame space to be inserted between consecutive frames in the time direction due to bursting is an integral multiple of the symbol length is checked (step S27). If the inter-frame space is not an integral multiple of the symbol length (No in step S27), padding of an appropriate length (see, for example, FIGS. 5B and 5C) is added to the forward portion or backward portion of the frame to be burst so that the length of padding+inter-frame space is aligned with an integral multiple of the symbol length (step S35).

Next, whether J has reached Nb, that is, processing to adjust the length of padding+inter-frame space is completed for all frames to be processed and those to be burst is checked (step S28).

If J has not reached Nb, that is, an unprocessed frame to be burst remains (No in step S28), J is incremented by 1 (step S33) before returning to step S27 to repeatedly perform processing to adjust the length of padding+inter-frame space by taking out the next unprocessed frame from the buffer.

On the other hand, if J has reached Nb, that is, processing to adjust the length of padding+inter-frame space is completed for all frames to be burst (Yes in step S28) or frames requested to transmit does not contain any frame to be burst (No in step S24), subsequently whether the frame length of the frame to be processed (that is, the frame taken out of the buffer in step S23) is equal to a length specified in advance is checked (step S29).

If the frame length is not equal to the specified length (No in step S29), the frame length is adjusted by adding padding to the frame so that the frame length becomes equal to the specified length (step S36).

Next, whether I has reached Ns, that is, processing to adjust the frame length is completed for all frames to be multiplexed at the same time is checked (step S30).

If I has not reached Ns, that is, an unprocessed frame to be multiplexed at the same time remains (No in step S30), I is incremented by 1 (step S34) before returning to step S24 to repeatedly perform processing to adjust the length of padding+inter-frame space between consecutive frames in the time direction and processing to adjust the frame length among frames to be multiplexed at the same time by taking out the next unprocessed frame from the buffer.

Then, when I reaches Ns, that is, processing to adjust the frame length is completed for all frames to be multiplexed at the same time (Yes in step S30), or frames requested to transmit are not to be multiplexed (No in step S21), a preamble and a header are added (step S31) to complete the frame before transmission processing of the frame being activated (step S32).

Figure 14:
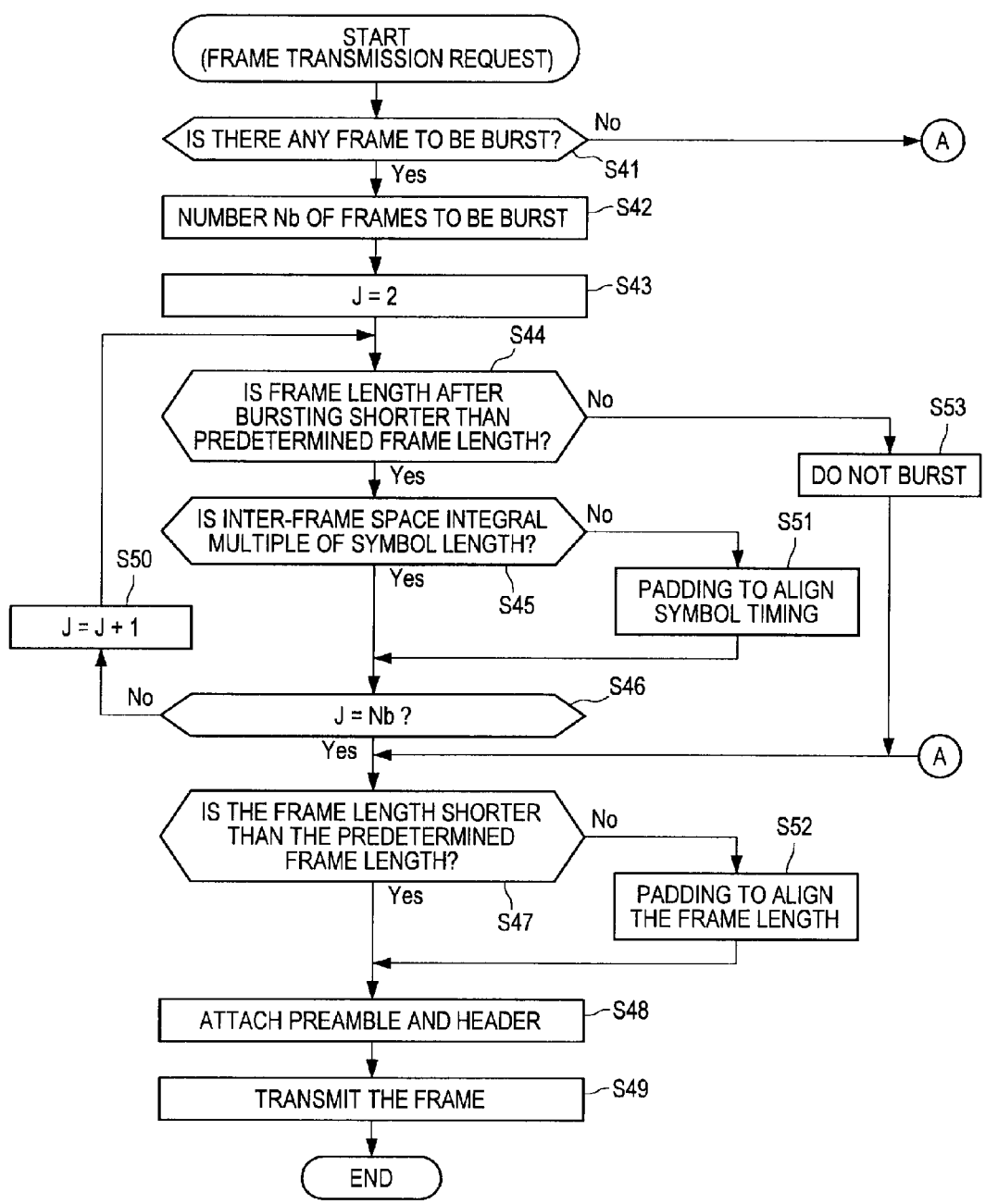
FIG. 14 is a flow chart showing the processing procedure when the communication apparatus multiplexes frames addressed to a specific user at the same time together with another one communication apparatus or more communication apparatuses.

FIG. 14 shows a processing procedure for adding padding to frames when the communication apparatus multiplexes frames addressed to a specific user at the same time together with another communication apparatus in the form of a flow chart. In the frame sequence example shown in FIG. 11, for example, the communication apparatus operating as the communicating station STA1, STA2, or STA3 performs this processing procedure.

The processing procedure is activated by, for example, reception of a frame transmission request from the upper layer of the communication protocol by the data processing unit 49 of the communication apparatus shown in FIG. 3. Received transmission frames are temporarily stored in, for example, a buffer (not shown) inside the data processing unit 49.

First, whether to burst, that is, to continuously transmit in the time direction frames requested to transmit is checked (step S41). If frames requested to transmit should be burst (Yes in step S41), the total number of frames to be burst is assigned to the variable Nb (step S42) and also the variable J to count the number of processed frames is set to the initial value 2 (step S43) before an unprocessed frame corresponding to the variable J being taken out from the buffer.

Next, whether the frame length after bursting is shorter than a predetermined frame length is checked (step S44). The predetermined frame length here is a frame length prearranged for multiplexing at the same time together with the other communication apparatus.

If the frame length after bursting is equal to or longer than the predetermined frame length (No in step S44), the frame is decided not to burst (step S53).

On the other hand, if the frame length after bursting is shorter than the predetermined frame length (Yes in step S44), subsequently whether the inter-frame space to be inserted between consecutive frames in the time direction due to bursting is an integral multiple of the symbol length is checked (step S45).

If the inter-frame space is not an integral multiple of the symbol length (No in step S45), padding of an appropriate length (see, for example, FIGS. 5B and 5C) is added to the forward portion or backward portion of the frame to be burst so that the length of padding+inter-frame space is aligned with an integral multiple of the symbol length (step S51).

Next, whether J has reached Nb, that is, processing to adjust the length of padding+inter-frame space is completed for all frames to be burst is checked (step S46).

If J has not reached Nb, that is, an unprocessed frame to be burst remains (No in step S46), J is incremented by 1 (step S50) before returning to step S44 to repeatedly perform processing to adjust the length of padding+inter-frame space by taking out the next unprocessed frame from the buffer.

If J has reached Nb, that is, processing to adjust the length of padding+inter-frame space is completed for all frames to be burst (Yes in step S46), or frames requested to transmit should not be burst (No in step S41), or frames requested to transmit are decided not be burst (step S53), subsequently whether the length of the frame is shorter than a predetermined frame length is checked (step S47). If the frame length is not shorter than the predetermined frame length (No in step S47), padding to align the frame length is performed (step S52).

Then, a preamble and a header are added (step S48) to complete the frame before transmission processing of the frame being activated (step S49).

By performing the processing procedures shown in FIGS. 12 to 14 in a communication apparatus on the transmitting side of data frames, the symbol timing of frames continuously transmitted in the time direction by applying bursting can be aligned with other frames multiplexed at the same time. Accordingly, on the receiver side, multiplexed frames can suitably be demultiplexed while avoiding interference between symbols so that signal decoding processing can be simplified. Moreover, the frame length of frames to be multiplexed at the same time is made uniform in the stage of final output and thus, instability of operation of AGC on the receiver side can be eliminated.

It should be understood by those skilled in the art that various modifications, combinations, sub-combinations and alterations may occur depending on design requirements and other factors insofar as they are within the scope of the appended claims or the equivalents thereof.

For example, the description herein has centered on embodiments applied to new wireless LAN standards such as IEEE802.11ac aiming to realize super-high throughput of 1 Gbps, but the subject matter of the present invention is not limited to this. The present invention can similarly be applied to, for example, other wireless LAN systems in which wireless resources on the spatial axes are shared by a plurality of users or various radio systems other than LAN.

Further, the description herein has centered on embodiments in which the method of aligning the symbol timing of frames transmitted continuously in the time direction among a plurality of frames to be multiplexed is applied to SDMA, but the subject matter of the present invention is not limited to this. For example, the present invention can be applied to other multiplexing/multiple access methods that multiplex a plurality of frames of code division multiple access (CDMA), frequency division multiple access (FDMA), and orthogonal frequency division multiple access (OFDMA), and time division multiple access (TDMA) or the like in the code axis direction, frequency axis direction, or time axis direction.

The scope of the present invention is not limited to systems based on the variable length frame format and the present invention can be applied to other various communication systems that require adjustments of the frame length such as a system that applies bursting technology.

To sum up, the present invention has been disclosed by way of illustration and content herein should not be interpreted too restrictively. To judge the subject matter of the present invention, appended claims should be considered.

The invention claimed is:

1. A communication apparatus to transmit a plurality of frames in a network, each frame including one or more symbols having a symbol length, the apparatus comprising:
    a data processor that adjusts an inter-frame space between two consecutive frames of the plurality of frames, upon determination that the inter-frame space is not an integral multiple of the symbol length, by inserting padding information between the two consecutive frames to form a guard interval between the padding information and a frame of the two consecutive frames not including the padding information, a length of the padding information and the guard interval being equal to an integral multiple of the symbol length; and
    a transmitter that transmits the adjusted consecutive frames.

2. The communication apparatus according to claim 1, wherein the padding information is a predetermined pattern.

3. A communication apparatus to transmit a plurality of frames in a network, each frame including one or more symbols having a symbol length, the apparatus comprising:
    a data processor that adjusts an inter-frame space between two consecutive frames of the plurality of frames, upon determination that the inter-frame space is not an integral multiple of the symbol length, by inserting padding information between the two consecutive frames, the padding information having a length equal to an integral multiple of the symbol length; and a transmitter that transmits the adjusted consecutive frames.

4. The communication apparatus according to claim 1, wherein
the two consecutive frames are associated with a first user,
the two consecutive frames are multiplexed with a frame associated with a second user, and
a sum of the length of the two consecutive frames, the first user padding information, and the guard interval is equal to a length of the frame associated with the second user.

5. A communication apparatus to transmit a plurality of frames in a network, each frame including one or more symbols having a symbol length, the apparatus comprising:
a data processor that adjusts an inter-frame space between two consecutive frames of the plurality of frames upon determination that the inter-frame space is not an integral multiple of the symbol length; and
a transmitter that transmits the adjusted consecutive frames, wherein
the plurality of frames include a set of frames associated with a first user, and a frame associated with a second user,
the data processor adds first user padding information between each consecutive frames included in the set of frames to form a guard interval between the first user padding information and a frame from each of the consecutive frames not including the first user padding information, and
the data processor adds second user padding information to the frame associated with the second user so that a sum of the length of the frame associated with the second user and the second user padding information is equal to a sum of the length of each frame included in the set of frames associated with the first user, each corresponding first user padding information, and each corresponding guard interval.

6. A communication system comprising:
a transmitter to:
adjust an inter-frame space between two consecutive frames of a plurality of frames, upon determination that the inter-frame space is not an integral multiple of the symbol length, by inserting padding information between the two consecutive frames to form a guard interval between the padding information and a frame of the two consecutive frames not including the padding information, a length of the padding information and the guard interval being equal to an integral multiple of the symbol length, and
transmit the adjusted consecutive frames; and
a receiver to receive the adjusted consecutive frames.

7. The communication system according to claim 6, wherein
the two consecutive frames are associated with a first user receiver,
the two consecutive frames are multiplexed with a frame associated with a second user receiver, and
a sum of the length of the two consecutive frames, the padding information, and the guard interval is equal to a length of the frame associated with the second user receiver.

8. A communication system comprising:
a transmitter to:
acquire an inter-frame space between two consecutive frames from a plurality of frames, each frame including one or more symbols having a symbol length,
adjust the inter-frame space between the two consecutive frames upon determination that the inter-frame space is not an integral multiple of the symbol length, and transmit the adjusted consecutive frames; and
a receiver to receive the adjusted consecutive frames, wherein
the transmitter adjusts the inter-frame space by inserting padding information between the two consecutive frames, the padding information having a length equal to an integral multiple of the symbol length.

9. A communication system comprising:
a transmitter to:
adjust an inter-frame space between two consecutive frames from a plurality of frames upon determination that the inter-frame space is not an integral multiple of the symbol length, and
transmit the adjusted consecutive frames; and
a receiver to receive the adjusted consecutive frames, wherein
the plurality of frames include a set of frames associated with a first user receiver, and a frame associated with a second user receiver,
the transmitter adds first user padding information between each consecutive frames included in the set of frames to form a guard interval between the first user padding information and a frame from each of the consecutive frames not including the first user padding information, and
the transmitter adds second user padding information to the frame associated with the second user receiver so that a sum of the length of the frame associated with the second user receiver and the second user padding information is equal to a sum of the length of each frame included in the set of frames associated with the first user receiver, each corresponding first user padding information, and each corresponding guard interval.

10. A method for transmitting a plurality of frames, each frame including one or more symbols having a symbol length, the method comprising:
adjusting an inter-frame space between two consecutive frames of the plurality of frames, upon determination that the inter-frame space is not an integral multiple of the symbol length, by inserting padding information between the two consecutive frames to form a guard interval between the padding information and a frame of the two consecutive frames not including the padding information, a length of the padding information and the guard interval being equal to an integral multiple of the symbol length; and
transmitting the adjusted consecutive frames.

11. The method according to claim 10, wherein
the two consecutive frames are associated with a first user,
the two consecutive frames are multiplexed with a frame associated with a second user, and
a sum of the length of the two consecutive frames, the padding information, and the guard interval is equal to a length of the frame associated with the second user.

12. A method for transmitting a plurality of frames, each frame including one or more symbols having a symbol length, the method comprising:
adjusting an inter-frame space between two consecutive frames of the plurality of frames upon determination that the inter-frame space is not an integral multiple of the symbol length; and transmitting the adjusted consecutive frames, wherein
the step of adjusting the inter-frame space further comprises:
inserting padding information between the two consecutive frames, the padding information having a length equal to an integral multiple of the symbol length.

13. A method for transmitting a plurality of frames, each frame including one or more symbols having a symbol length, the method comprising:
adjusting an inter-frame space between two consecutive frames of the plurality of frames upon determination that the inter-frame space is not an integral multiple of the symbol length; and
transmitting the adjusted consecutive frames, wherein the plurality of frames include a set of frames associated with a first user, and a frame associated with a second user, the method further comprising:
adding first user padding information between each consecutive frames included in the set of frames to form a guard interval between the first user padding information and a frame from each of the consecutive frames not including the first user padding information, and
adding second user padding information to the frame associated with the second user so that a sum of the length of the frame associated with the second user and the second user padding information is equal to a sum of the length of each frame included in the set of frames associated with the first user, each corresponding first user padding information, and each corresponding guard interval.

14. A non-transitory computer readable medium having instructions stored thereon, which when executed by a processor in a communication apparatus, causes the processor to:
adjust an inter-frame space between two consecutive frames of a plurality of frames, upon determination that the inter-frame space is not an integral multiple of the symbol length, by inserting padding information between the two consecutive frames to form a guard interval between the padding information and a frame of the two consecutive frames not including the padding information, a length of the padding information and guard interval being equal to an integral multiple of the symbol length; and
transmit the adjusted consecutive frames.

* * * * *